United States Patent
Zhao et al.

(10) Patent No.: US 11,134,272 B2
(45) Date of Patent: Sep. 28, 2021

(54) MEMORY REDUCTION FOR NON-SEPARABLE TRANSFORMS

(71) Applicant: QUALCOMM Incorporated, San Diego, CA (US)

(72) Inventors: Xin Zhao, San Diego, CA (US); Vadim Seregin, San Diego, CA (US); Amir Said, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/020,511

(22) Filed: Jun. 27, 2018

(65) Prior Publication Data

US 2019/0007705 A1 Jan. 3, 2019

Related U.S. Application Data

(60) Provisional application No. 62/526,807, filed on Jun. 29, 2017.

(51) Int. Cl.
*H04N 19/61* (2014.01)
*H04N 19/176* (2014.01)
(Continued)

(52) U.S. Cl.
CPC ............ *H04N 19/61* (2014.11); *H04N 19/12* (2014.11); *H04N 19/176* (2014.11);
(Continued)

(58) Field of Classification Search
None
See application file for complete search history.

(56) References Cited

U.S. PATENT DOCUMENTS

| 7,194,139 B1* | 3/2007 | Sariel | G06E 3/005 |
| | | | 359/558 |
| 8,731,062 B2* | 5/2014 | Kanumuri | G06F 17/145 |
| | | | 375/240.02 |

(Continued)

FOREIGN PATENT DOCUMENTS

WO 2017058615 A1 4/2017

OTHER PUBLICATIONS

Michele et al., "Joint Compressive Video Coding Analysis", IEEE Transactions of Multimedia, Vo;. 12, No. 3, Apr. 2010 (Year: 2010).*

(Continued)

*Primary Examiner* — Mohammad J Rahman
(74) *Attorney, Agent, or Firm* — Qualcomm Incorporated

(57) ABSTRACT

Techniques are described in which a decoder is configured to receive an input data block and apply an inverse non-separable transform to at least part of the input data block to generate an inverse non-separable transform output coefficient block. The applying the inverse non-separable transform comprises assigning a window, assigning a weight for each position inside the assigned window, and determining the inverse non-separable transform output coefficient block based on the assigned weights. The decoder is further configured to forming a decoded video block based on the determined inverse non-separable transform output coefficient block, wherein forming the decoded video block comprises summing the residual video block with one or more predictive blocks.

45 Claims, 13 Drawing Sheets

(51) Int. Cl.
  *H04N 19/50* (2014.01)
  *H04N 19/18* (2014.01)
  *H04N 19/12* (2014.01)
  *H04N 19/42* (2014.01)
  *H04N 19/60* (2014.01)

(52) U.S. Cl.
  CPC ............ *H04N 19/18* (2014.11); *H04N 19/42* (2014.11); *H04N 19/50* (2014.11); *H04N 19/60* (2014.11)

(56) References Cited

U.S. PATENT DOCUMENTS

| | | | |
|---|---|---|---|
| 2009/0195697 A1* | 8/2009 | Kanumuri | G06F 17/145 348/607 |
| 2012/0082232 A1* | 4/2012 | Sole Rojals | H04N 19/176 375/240.18 |
| 2014/0169444 A1* | 6/2014 | Ottaviano | H04N 19/147 375/240.01 |
| 2016/0037061 A1* | 2/2016 | Lim | H04N 5/23229 348/241 |
| 2017/0061234 A1* | 3/2017 | Lim | G06T 5/002 |
| 2017/0064335 A1* | 3/2017 | Na | H04N 19/61 |
| 2017/0339404 A1* | 11/2017 | Panusopone | H04N 19/107 |
| 2017/0374369 A1* | 12/2017 | Chuang | H04N 19/44 |
| 2018/0041760 A1* | 2/2018 | Koo | H04N 19/96 |
| 2018/0146195 A1* | 5/2018 | Koo | H04N 19/122 |
| 2018/0167618 A1* | 6/2018 | Lee | H04N 19/176 |
| 2018/0213233 A1* | 7/2018 | Koo | H04N 19/159 |
| 2018/0220158 A1* | 8/2018 | Koo | H04N 19/159 |
| 2018/0288407 A1* | 10/2018 | Lee | H04N 19/107 |
| 2018/0288411 A1* | 10/2018 | Egilmez | H04N 19/176 |
| 2019/0104303 A1* | 4/2019 | Xiu | H04N 19/105 |
| 2019/0191155 A1* | 6/2019 | Ko | H04N 19/176 |

OTHER PUBLICATIONS

IP.com search report.*
International Search Report and Written Opinion—PCT/US2018/040060—ISA/EPO—dated Sep. 24, 2018.
Jang H., et al., "Adaptive NSST Kernel Size Selection," 5. JVET Meeting; Jan. 12, 2017-Jan. 20, 2017; Geneva; (The Joint Video Exploration Team of ISO/IEC JTC1/SC29/WG11 and ITU-T SG.16); URL: http://phenix.int-evry.fr/jvet/,, No. JVET-E0047-v3, Jan. 13, 2017, 6 pages, XP030150519.
Xin Z., et al., "NSST: Non-separable Secondary Transforms for Next Generation Video Coding," Picture Coding Symposium (PCS), Dec. 4, 2016, pp. 1-5, XP033086901, DOI: 10.1109/PCS.2016.7906344, [retrieved on Apr. 19, 2017].

* cited by examiner

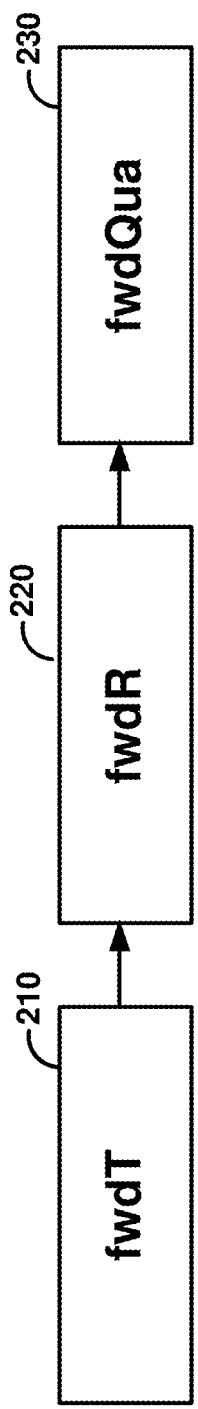
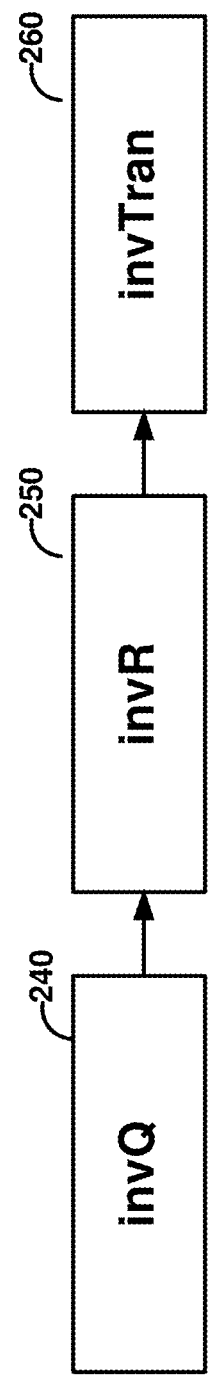
FIG. 2A
FIG. 2B

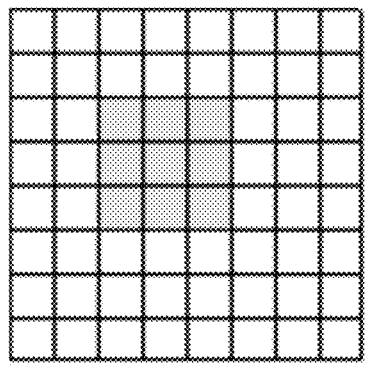
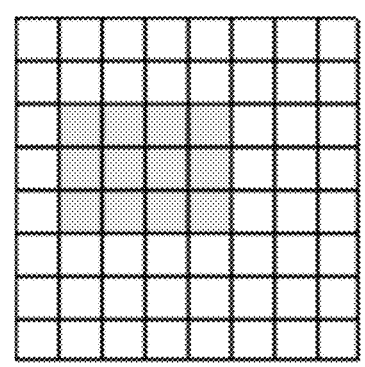
FIG. 8A    FIG. 8B
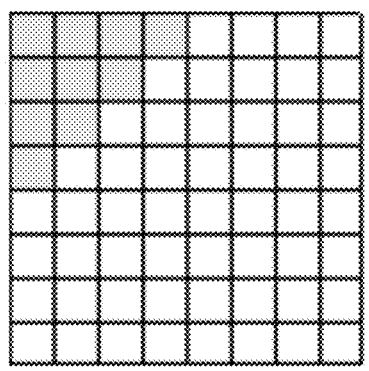
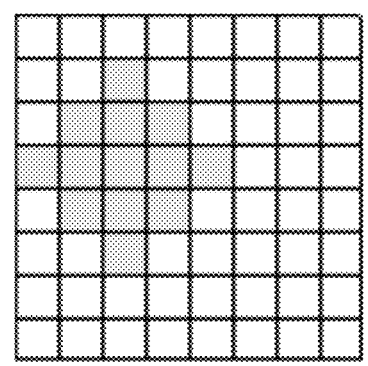
FIG. 8C    FIG. 8D
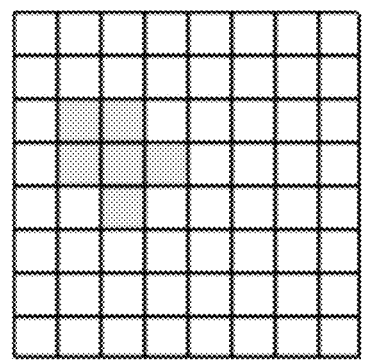
FIG. 8E

|219|-76|-43| | | | | |
|---|---|---|---|---|---|---|---|
|-85|35|14| | | | | |
|-29|9|7| | | | | |
| | | | | | | | |
| | | | | | | | |
| | | | | | | | |
| | | | | | | | |
| | | | | | | | |

FIG. 9

MEMORY REDUCTION FOR NON-SEPARABLE TRANSFORMS

RELATED APPLICATIONS

This application is related to U.S. Provisional Application No. 62/526,807, filed Jun. 29, 2017, the entirety of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in various standards including defined by ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264/MPEG-4, Part 10, Advanced Video Coding (AVC), and ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to non-separable transform designs applied in video coding. The transform may be used in the context of advanced video codecs, such as HEVC, extensions of HEVC, or the next generation of video coding standards.

In one example, the disclosure describes a method of encoding video data, the method comprising forming a residual video block, wherein forming the residual video block comprises subtracting at least one predictive block from a video block being coded; applying a non-separable transform to at least part of an input data block to generate a non-separable transform output coefficient block, wherein applying the non-separable transform comprises assigning a window, assigning a weight for each position inside the assigned window, and determining the non-separable transform output coefficient block based on the assigned weights; and generating the encoded video data based on the determined non-separable transform output coefficient block.

In one example, the disclosure describes a method of decoding video data, the method comprising receiving an input data block; applying an inverse non-separable transform to at least part of the input data block to generate an inverse non-separable transform output coefficient block, wherein applying the inverse non-separable transform comprises assigning a window, assigning a weight for each position inside the assigned window, and determining the inverse non-separable transform output coefficient block based on the assigned weights; and forming a decoded video block based on the determined inverse non-separable transform output coefficient block, wherein forming the decoded video block comprises summing a residual video block with one or more predictive blocks.

In one example, the disclosure describes an apparatus for encoding video data comprising a memory configured to store the video data; and a video encoder configured to form a residual video block, wherein forming the residual video block comprises subtracting at least one predictive block from a video block being coded; apply a non-separable transform to at least part of an input data block to generate a non-separable transform output coefficient block, wherein applying the non-separable transform comprises assigning a window, assigning a weight for each position inside the assigned window, and determining the non-separable transform output coefficient block based on the assigned weights; and generate the encoded video data based on the determined non-separable transform output coefficient block.

In one example, the disclosure describes an apparatus for decoding video data comprising a memory configured to store the video data; and a video decoder configured to receive an input data block; apply an inverse non-separable transform to at least part of the input data block to generate an inverse non-separable transform output coefficient block, wherein applying the inverse non-separable transform comprises assigning a window, assigning a weight for each position inside the assigned window, and determining the inverse non-separable transform output coefficient block based on the assigned weights; and form a decoded video block based on the determined inverse non-separable transform output coefficient block, wherein forming the decoded video block comprises summing a residual video block with one or more predictive blocks.

BRIEF DESCRIPTION OF DRAWINGS

FIG. 2A is a simplified illustration of a transform process at a video encoder.

FIG. 2B is a simplified illustration of a transform process at a video decoder.

FIG. 8A is a simplified illustration of an assigned window.
FIG. 8B is a simplified illustration of an assigned window.
FIG. 8C is a simplified illustration of an assigned window.
FIG. 8D is a simplified illustration of an assigned window.
FIG. 8E is a simplified illustration of an assigned window.

FIG. 9 is a simplified illustration of assigned weights within an assigned window

DETAILED DESCRIPTION

Figure 1:
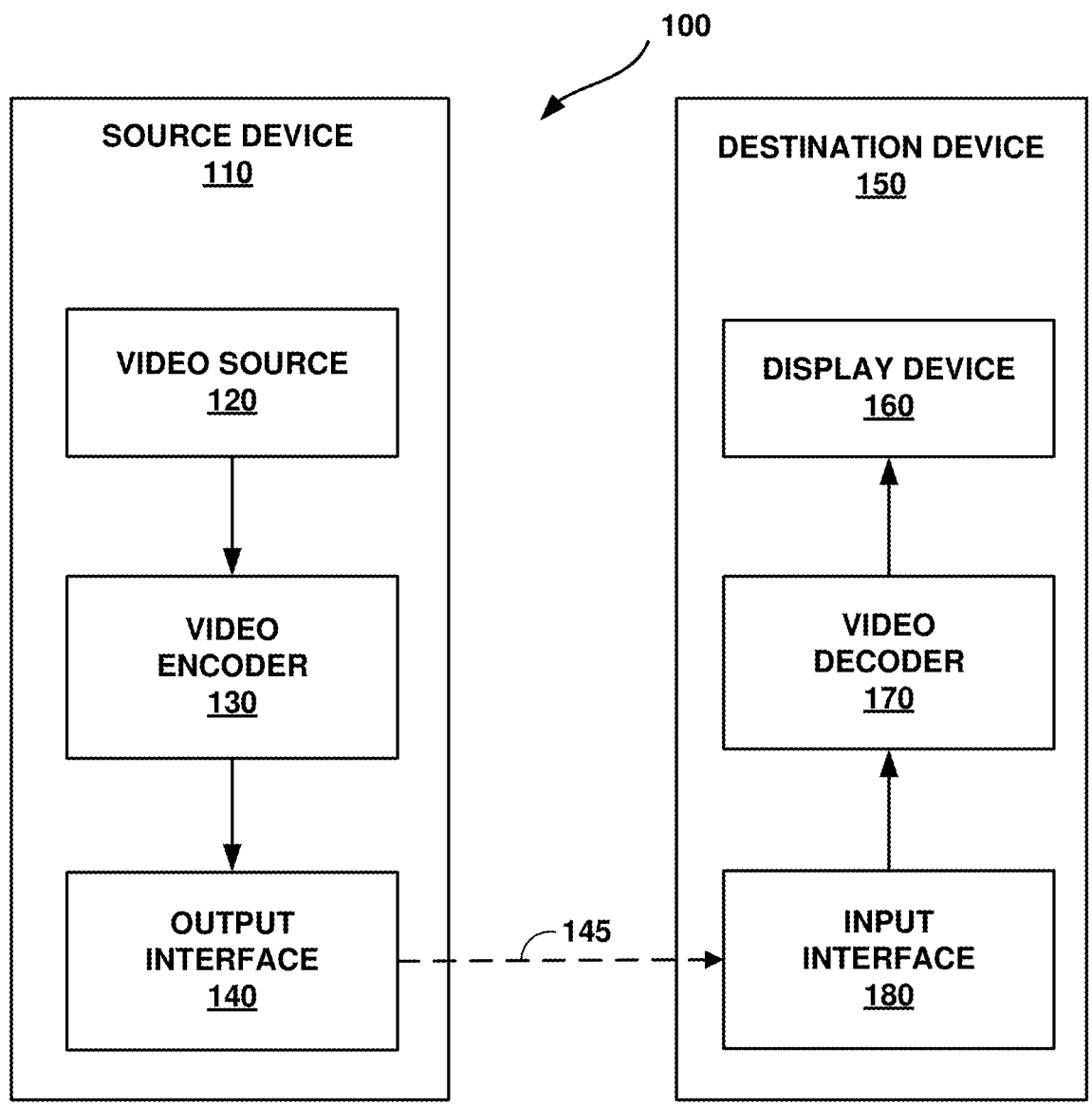
FIG. 1 is a simplified block diagram illustrating an example video encoding and decoding system that may utilize techniques described in this disclosure.

FIG. 1 is a block diagram illustrating an example video encoding and decoding system 100 that may utilize techniques described in this disclosure. As shown in FIG. 1, system 100 includes a source device 110 that provides encoded video data to be decoded at a later time by a destination device 150. In particular, source device 110 provides the video data to destination device 150 via a computer-readable medium 145. Source device 110 and destination device 150 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 110 and destination device 150 may be equipped for wireless communication.

Destination device 150 may receive the encoded video data to be decoded via computer-readable medium 145. Computer-readable medium 145 may comprise any type of medium or device capable of moving the encoded video data from source device 110 to destination device 150. In an example, computer-readable medium 145 may comprise a communication medium to enable source device 110 to transmit encoded video data directly to destination device 150 in real-time. The encoded video data may be modulated according to a communication standard, such as a wireless communication protocol, and transmitted to destination device 150. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 110 to destination device 150.

In some examples, encoded data may be output from output interface 140 to a storage device. Similarly, encoded data may be accessed from the storage device by input interface 180. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 110. Destination device 150 may access stored video data from the storage device via streaming or download. The file server may be any type of server capable of storing encoded video data and transmitting that encoded video data to destination device 150. Example file servers include a web server (e.g., for a website), an FTP server, network attached storage (NAS) devices, or a local disk drive. Destination device 150 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 100 may be configured to support one-way or two-way video transmission to support applications such as video streaming, video playback, video broadcasting, and/or video telephony.

In the example of FIG. 1, source device 110 includes video source 120, video encoder 130, and output interface 140. Destination device 150 includes input interface 180, video decoder 170, and display device 160. In accordance with this disclosure, video encoder 130 of source device 110 may be configured to apply the techniques described in this disclosure, such as, for example, techniques relating to secondary transforms. In accordance with this disclosure, video decoder 170 of destination device 150 may be configured to apply the techniques described in this disclosure, such as, for example, techniques relating to secondary transforms. In other examples, a source device and a destination device may include other components or arrangements. For example, source device 110 may receive video data from an external video source 120, such as an external camera. Likewise, destination device 150 may interface with an external display device, rather than including an integrated display device.

As noted above, source device 110 includes output interface 140 and destination device 150 includes input interface 180. In some examples, output interface 140 represents a transmitter and input interface 180 represents a receiver. In other examples, output interface 140 and input interface 180 represent examples of transceivers (that is, interfaces capable of both transmitting and receiving data signals wirelessly). The transceivers may be configured to send and receive video data in wireless signals. For example, output interface 140, when implemented as a transceiver, may send a data signal (e.g., computer-readable medium 145) including encoded video data, while input interface 180, when implemented as a transceiver, may receive a data signal (e.g., computer-readable medium 145) including encoded video data. As discussed above, video encoder 130 may provide the encoded video data to output interface 140, while input interface 180 may provide encoded video data to video decoder 170.

The illustrated system 100 of FIG. 1 is merely one example. Techniques described in this disclosure may be performed by any digital video encoding and/or decoding device. Although generally the techniques of this disclosure are performed by a video encoding device and a video decoding device, the techniques may also be performed by a video encoder/decoder, typically referred to as a "CODEC." Source device 110 and destination device 150 are merely examples of such coding devices in which source device 110 generates coded video data for transmission to destination device 150. In some examples, devices 110, 150 may operate in a substantially symmetrical manner such that each of devices 110, 150 include video encoding and decoding components. Hence, system 100 may support one-way or two-way video transmission between source device 110 and destination device 150, e.g., for video streaming, video playback, video broadcasting, or video telephony.

Video source 120 of source device 110 may include a video capture device, such as a video camera, a video archive containing previously captured video, and/or a video feed interface to receive video from a video content provider. As a further alternative, video source 120 may generate computer graphics-based data as the source video, or a combination of live video, archived video, and computer-generated video. In some cases, source device 110 and destination device 150 may form so-called camera phones or video phones. As mentioned above, however, the techniques described in this disclosure may be applicable to video coding in general and may be applied to wireless and/or wired applications. In each case, the captured, pre-captured, or computer-generated video may be encoded by video encoder 130. The encoded video information may then be output by output interface 140 onto computer-readable medium 145.

Computer-readable medium 145 may include transient media, such as a wireless broadcast or wired network transmission. In some examples, a network server (not shown) may receive encoded video data from source device 110 and provide the encoded video data to destination device 150, e.g., via network transmission. Therefore, computer-readable medium 145 may be understood to include one or more computer-readable media of various forms, in various examples.

Input interface 180 of destination device 150 receives information from computer-readable medium 145. The information of computer-readable medium 145 may include syntax information defined by video encoder 130, which is also used by video decoder 170, that includes syntax elements that describe characteristics and/or processing of blocks and other coded units. Display device 160 displays the decoded video data to a user and may comprise any of a variety of display devices such as a cathode ray tube (CRT), a liquid crystal display (LCD), a plasma display, an organic light emitting diode (OLED) display, or another type of display device.

Video encoder 130 and video decoder 170 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 130 and video decoder 170 may be included in one or more encoders or decoders, either of which may be integrated as part of a combined encoder/decoder (CODEC) in a respective device. A device including video encoder 130 and/or video decoder 170 may comprise an integrated circuit, a microprocessor, and/or a wireless communication device, such as a cellular telephone.

Video encoder 130 and video decoder 170 may operate according to a video coding standard, such as the standards described above and, in some examples, according to the High Efficiency Video Coding (HEVC) standard, also referred to as ITU-T H.265, or extensions of the HEVC standard, or according to the next generation of video coding standards. The techniques of this disclosure, however, are not limited to any particular coding standard. Other examples of video coding standards include MPEG-2 and ITU-T H.263. Although not shown in FIG. 1, in some aspects, video encoder 130 and video decoder 170 16 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a protocol such as the ITU H.223 multiplexer protocol, or other protocols such as the user datagram protocol (UDP).

The techniques of this disclosure are generally described with respect to ITU-T H.265, also referred to as High Efficiency Video Coding (HEVC), which is described in "SERIES H: AUDIOVISUAL AND MULTIMEDIA SYSTEMS, Infrastructure of audiovisual services—Coding of moving video," *High Efficiency Video Coding*, ITU-T H.265, April 2013. However, these techniques may be applied to other video coding standards, including successor standards to HEVC and its extensions, extensions of HEVC, extensions of other standards, as well as other video compression techniques (e.g., non-standardized codecs). Examples of other video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264/MPEG-4, Part 10, Advanced Video Coding (AVC), including its Scalable Video Coding (SVC) and Multiview Video Coding (MVC) extensions.

The H.265 standard was recently finalized by the Joint Collaboration Team on Video Coding (JCT-VC) of ITU-T Video Coding Experts Group (VCEG) and ISO/IEC Motion Picture Experts Group (MPEG). An HEVC draft specification, referred to as HEVC WD hereinafter, is available from http://phenix.int-evry.fr/jct/doc_end_user/documents/ 14_Vienna/wg11/JCTVC-N1003-v1.zip.

The multiview extension to HEVC, MV-HEVC, has also been developed by the JCT-3V. An example of a Working Draft (WD) of MV-HEVC, referred to as MV-HEVC WD8, is available from phenix.it-sudparis.eu/jct2/doc_end_user/ documents/8_Valencia/wg11/JCT3V-H1002-v5.zip. A scalable extension to HEVC, named SHVC, has also been developed by the JCT-VC. An example of a Working Draft (WD) of SHVC, referred to as SHVC WD6, is available from phenix.it-sudparis.eu/jct/doc_end_user/documents/17_Valencia/wg11/JCTVC-Q1008-v2.zip.

In HEVC and other video codecs, a video frame or picture may be divided into a sequence of treeblocks, which are also known as largest coding units (LCUs), that may include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices.

To generate an encoded CTU (i.e., to encode a CTU) in HEVC, video encoder 130 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Each treeblock may be split into CUs according to a quadtree data structure. In general, a quadtree data structure includes one node per CU, with a root node corresponding to the treeblock. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively and may depend on whether the CU is split into sub-CUs. If a CU is not split further, it is referred as a leaf-CU. In this disclosure, four sub-CUs of a leaf-CU are also referred to as leaf-CUs even if there is no explicit splitting of the original leaf-CU. For example, if a CU at 16×16 size is not split further, the four 8×8 sub-CUs are also referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). A size of the CU corresponds to a size of the coding node and is generally square in shape. The size of the CU may range from 8×8 pixels up to the size of the treeblock with a maximum size, e.g., 64×64 pixels or greater.

A CU includes a coding node and prediction units (PUs) and transform units (TUs) associated with the coding node. Each CU may contain one or more PUs and one or more TUs. Syntax data associated with a CU may describe, for example, partitioning of the CU into one or more PUs. As part of encoding a CU, video encoder 130 may partition a coding block of the CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 130 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 130 may use intra prediction or inter prediction to generate the predictive blocks for a PU. Each CU is coded with one of either intra prediction mode or inter prediction mode. If video encoder 130 uses intra prediction to generate the predictive blocks of a PU, video encoder 130 may generate the predictive blocks of the PU based on decoded samples of the picture associated with the PU. If video encoder 130 uses inter prediction to generate the predictive blocks of a PU, video encoder 130 may generate the predictive blocks of the PU based on decoded samples of one or more pictures other than the picture associated with the PU.

Partitioning modes may differ between whether the CU is skip or direct mode encoded, intra-prediction mode encoded, or inter-prediction mode encoded. PUs may be partitioned to be non-square in shape.

Furthermore, video encoder 130 may decompose each residual block of a CU into one or more transform blocks. A transform block may be a rectangular (square or non-square) block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block. In some examples, the residual blocks the same CU for luma and chroma components may be partitioned in different ways.

Syntax data associated with a CU may also describe, for example, partitioning of the CU into one or more TUs according to a quadtree. A TU can be square or non-square (e.g., rectangular) in shape. This disclosure may use the term "block" to refer to any of a CU, PU, or TU, in the context of HEVC, or similar data structures in the context of other standards (e.g., macroblocks and sub-blocks thereof in H.264/AVC).

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more PUs. In general, a PU represents a spatial area corresponding to all or a portion of the corresponding CU and may include data for retrieving and/or generating a reference sample for the PU. Moreover, a PU includes data related to prediction. For example, when the PU is intra-mode encoded, data for the PU may be included in a RQT, which may include data describing an intra-prediction mode for a TU corresponding to the PU. The RQT may also be referred to as a transform tree. In some examples, the intra-prediction mode may be signaled in the leaf-CU syntax, instead of the RQT. As an example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as RQTs or transform trees as noted above. That is, a leaf-CU may include a quadtree indicating how the leaf-CU is partitioned into TUs. The root node of a TU quadtree generally corresponds to a leaf-CU, while the root node of a CU quadtree generally corresponds to a treeblock. TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. Each slice of a picture may include slice syntax data that describes an encoding mode for the respective slice. Video encoder 130 typically operates on video blocks within individual video slices in order to encode the video data. A video block may correspond to a coding node within a CU. The video blocks may have fixed or varying sizes and may differ in size according to a specified coding standard.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 130 may calculate residual data for the TUs of the CU. The PUs may comprise syntax data describing a technique or mode of generating predictive pixel data in the spatial domain (also referred to as the pixel domain) and the TUs may comprise coefficients in the transform domain following application of a transform, e.g., a Discrete Cosine Transform (DCT), an integer transform, a wavelet transform, or a conceptually similar transform to residual video data. The residual data may correspond to pixel differences between pixels of the unencoded picture and prediction values corresponding to the PUs. Video encoder 130 may form the TUs to include quantized transform coefficients representative of the residual data for the CU. That is, video encoder 130 may calculate the residual data (in the form of a residual block), transform the residual block to produce a block of transform coefficients, and then quantize the transform coefficients to form quantized transform coefficients. Video encoder 130 may form a TU including the quantized transform coefficients, as well as other syntax information (e.g., splitting information for the TU).

As noted above, following application of any transforms to produce transform coefficients, video encoder 130 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 130 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 130 may utilize a predefined scan order to scan the quantized transform coefficients to produce a serialized vector that can be entropy encoded. In other examples, video encoder 130 may perform an adaptive scan. After scanning the quantized transform coefficients to form a one-dimensional vector, video encoder 130 may entropy encode particular syntax elements representing transform coefficients in the one-dimensional vector, e.g., according to context-adaptive variable length coding (CAVLC), context-adaptive binary arithmetic coding (CABAC), syntax-based context-adaptive binary arithmetic coding (SBAC), probability interval partitioning entropy (PIPE) coding or another entropy encoding methodology. Video encoder 130 may also entropy encode syntax elements associated with the encoded video data for use by video decoder 170 in decoding the video data.

In general, video decoder 170 performs a similar, albeit reciprocal, process to that performed by video encoder 130 to decode encoded data. For example, video decoder 170 inverse quantizes and inverse transforms coefficients of a received TU to reproduce a residual block. Video decoder 170 may use a signaled prediction mode (intra- or inter-prediction) to form a predicted block. Video decoder 170 may combine the predicted block and the residual block (on a pixel-by-pixel basis) to reproduce the original block. Video decoder 170 may perform additional processing, such as performing a deblocking process, to reduce visual artifacts along block boundaries. Furthermore, video decoder 170 may decode syntax elements using CABAC in a manner substantially similar to, albeit reciprocal to, the CABAC encoding process of video encoder 130.

As previously noted, video encoder 130 may apply a DCT, an integer transform, a wavelet transform, or a conceptually similar transform to residual video data. Such separable transforms may indicate the process of deriving an alternative representation of the input signal. Given an N-point vector $x=[x_0, x_1, \ldots x_{N-1}]^T$ and a set of given vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows, $$\hat{x} = \Sigma_{i=0}^{M-1} f_i \cdot \Phi_i$$

where $\hat{x}$ can be an approximation or equivalent of x, vector $f=[f_1, f_2, \ldots f_{M-1}]$ is called the transform coefficient vector and $\{\Phi_0, \Phi_1, \ldots, \Phi_{M-1}\}$ are the transform basis vectors.

In the scenario of video coding, transform coefficients may be roughly non-correlated and sparse. For example, the energy of the input vector x may be compacted only on a few transform coefficients, and the remaining majority transform coefficients are typically close to zero.

Given the specific input data, the optimal transform in terms of energy compaction may be the so-called Karhunen-Loeve transform (KLT). The KLT uses the eigenvectors of the covariance matrix of the input data as transform basis vectors. Therefore, KLT is actually a data-dependent transform and does not have a general mathematical formulation. However, under certain assumptions, such as the input data forming a first-order stationary Markov process, it has been proven in the literature that the corresponding KLT is actually a member of the sinusoidal family of unitary transforms, which are described in Jain, A. K., A sinusoidal family of unitary transforms, IEEE Trans. on Pattern Analysis and Machine Intelligence, 1, 356, 1979. The sinusoidal family of unitary transforms may indicate transforms using transform basis vectors formulated as follows:

$$\Phi_m(k) = A \cdot e^{ike} + B \cdot e^{ike}$$

In the equation above, e is the base of the natural logarithm approximately equal to 2.71828, A, B, and θ are complex in general, and depend on the value of m. Additionally, in the equation above, $\Phi_m$ is a vector, $\Phi_m(k)$ indicates the kth component of vector $\Phi_m$, and i indicates the imaginary part of a complex number.

Several well-known transforms, including the discrete Fourier transform, cosine transform, sine transform, and the KLT (for first-order stationary Markov processes), are members of this sinusoidal family of unitary transforms. As described in S. A. Martucci, "Symmetric convolution and the discrete sine and cosine transforms," IEEE Trans. Sig. Processing SP-42, 1038-1051 (1994), the complete DCT and Discrete Sine Transform (DST) families may include a total of 16 transforms based on different types and a complete definition of the different types of DCT and DST are given below. The different types may correspond to different values of A, B, and θ.

Assume an input N-point vector is denoted as $x=[x_0, x_1, \ldots, x_{N-1}]^T$, and the N-point vector is transformed to another N-point transform coefficient vector denoted as $y=[y_0, y_1, \ldots, y_{N-1}]^T$ by multiplying a matrix. The process transforming x to y can be further illustrated according to one of the following transform formulations, wherein k ranges from 0 through N−1, inclusive:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n, \text{ where}$$

$$w_0 = \begin{cases} \frac{1}{\sqrt{2}}, & \text{if } n=0 \text{ or } n=N-1 \\ 1, & \text{otherwise} \end{cases},$$

$$w_1 = \begin{cases} \frac{1}{\sqrt{2}}, & \text{if } k=0 \text{ or } k=N-1 \\ 1, & \text{otherwise} \end{cases}$$

DCT Type-II (DCT-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n, \text{ where}$$

$$w_0 = \begin{cases} \frac{1}{\sqrt{2}}, & \text{if } k=0 \\ 1, & \text{otherwise} \end{cases}$$

DCT Type-III (DCT-3):

$$y_k = \sum_{n=0}^{N-1} \sqrt{\frac{2}{N}} \cos\left(\frac{\pi \cdot n \cdot (k+0.5)}{N}\right) \cdot w_0 \cdot x_n, \text{ where}$$

$$w_0 = \begin{cases} \frac{1}{\sqrt{2}}, & \text{if } n=0 \\ 1, & \text{otherwise} \end{cases}$$

DCT Type-IV (DCT-4):

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

DCT Type-V (DCT-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n, \text{ where}$$

$$w_0 = \begin{cases} \frac{1}{\sqrt{2}}, & \text{if } n=0 \\ 1, & \text{otherwise} \end{cases}, w_1 = \begin{cases} \frac{1}{\sqrt{2}}, & \text{if } k=0 \\ 1, & \text{otherwise} \end{cases}$$

DCT Type-VI (DCT-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n, \text{ where}$$

$$w_0 = \begin{cases} \frac{1}{\sqrt{2}}, & \text{if } n=N-1 \\ 1, & \text{otherwise} \end{cases}, w_1 = \begin{cases} \frac{1}{\sqrt{2}}, & \text{if } k=0 \\ 1, & \text{otherwise} \end{cases}$$

DCT Type-VII (DCT-7):

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n, \text{ where}$$

$$w_0 = \begin{cases} \frac{1}{\sqrt{2}}, & \text{if } n=0 \\ 1, & \text{otherwise} \end{cases}, w_1 = \begin{cases} \frac{1}{\sqrt{2}}, & \text{if } k=N-1 \\ 1, & \text{otherwise} \end{cases}$$

DCT Type-VIII (DCT-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

-continued

DST Type-I (DST-1):
$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):
$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n, \text{ where}$$
$$w_0 = \begin{cases} \frac{1}{\sqrt{2}}, & \text{if } k = N-1 \\ 1, & \text{otherwise} \end{cases}$$

DST Type-III (DST-3):
$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n, \text{ where}$$
$$w_0 = \begin{cases} \frac{1}{\sqrt{2}}, & \text{if } n = N-1 \\ 1, & \text{otherwise} \end{cases}$$

DST Type-IV (DST-4):
$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):
$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):
$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7):
$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8):
$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n, \text{ where}$$
$$w_0 = \begin{cases} \frac{1}{\sqrt{2}}, & \text{if } n = N-1 \\ 1, & \text{otherwise} \end{cases}, w_1 = \begin{cases} \frac{1}{\sqrt{2}}, & \text{if } k = N-1 \\ 1, & \text{otherwise} \end{cases}$$

A transform type, such as a DST type, may be specified by a mathematical formulation of a transform basis function. For example, 4-point DST-VII and 8-point DST-VII have the same transform type, regardless the value of N.

Without loss of generality, all the above transform types may be represented using the generalized formulation below:

$$y_m = \sum_{n=0}^{N-1} T_{m,n} \cdot x_n.$$

In the equation above, T is the transform matrix that may be specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots T_{i,N-1}]$ are the $i^{th}$ transform basis vectors. A transform applied on the N-point input vector may be called an N-point transform.

It is also noted that the above transform formulations, which are applied on the 1-D input data x, can be represented in matrix multiplication form as below:

$$y = T \cdot x$$

In the equation above, T indicates the transform matrix, x indicates the input data vector, and y indicates the output transform coefficients vector.

The transforms introduced in the previous section may be applied on 1-D input data, and transforms can be also extended for 2-D input data sources. In the following discussion, X is an input M×N data array. The techniques of applying transform on 2-D input data may include separable and non-separable 2-D transforms.

A separable 2-D transform applies 1-D transforms for horizontal and vertical vectors of X sequentially, formulated as below:

$$Y = C \cdot X \cdot R^T$$

In the equation above, C and R denote the given M×M and N×N transform matrices, respectively. From the formulation, it can be seen that C applies 1-D transforms for the column vectors of X, while R applies 1-D transforms for row vectors of X. In the later part of this document, for simplicity, C and R are denoted as left (vertical) and right (horizontal) transforms and they both form a transform pair. There are cases when C is equal to R and is an orthogonal matrix. In such a case, the separable 2-D transform may be determined by just one transform matrix.

In some examples, a non-separable 2-D transform may first reorganize all elements of X into a single vector, namely X', by applying the following mathematical mapping:

$$X'_{(i \cdot N + j)} = X_{i,j}$$

Then, a 1-D transform T' may be applied for X' as below:

$$Y = T' \cdot X'$$

In the equation above, T' is an (M*N)×(M*N) transform matrix.

In video coding, separable 2-D transforms may be applied because 2-D transforms may use fewer operation counts (e.g., addition, multiplication) as compared to a 1-D transform.

In conventional video codecs, such as H.264/AVC, an integer approximation of the 4-point and 8-point DCT Type-II may be applied for both intra and inter prediction residual. In other words, a video coder may apply an integer approximation of the 4-point and 8-point DCT Type-II to residual blocks generated using intra or inter prediction. To better accommodate various statistics of residual samples, more flexible types of transforms other than DCT Type-II may be utilized in the new generation video codec. For example, in HEVC, an integer approximation of the 4-point Type-VII DST may be utilized for intra prediction residual. As described in J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729, it has been both theoretically proven and experimentally validated that the DST Type-VII used in HEVC is more efficient than DCT Type-II for residuals vectors generated along intra prediction directions. For instance, DST Type-VII is more efficient than DCT Type-II for row residual vectors generated by the horizontal intra prediction direction. In HEVC, an integer approximation of 4-point DST Type-VII may be applied only for 4×4 luma intra prediction residual blocks. The 4-point DST-VII used in HEVC is shown below:

4×4 DST-VII:
 {29, 55, 74, 84}
 {74, 74, 0,−74}
 {84,−29,−74, 55}
 {55,−84, 74,−29}

In HEVC, for residual blocks that are not 4×4 luma intra prediction residual blocks, integer approximations of the 4-point, 8-point, 16-point and 32-point DCT Type-II may also be applied, as shown below:

4-Point DCT-II:
 {64, 64, 64, 64}
 {83, 36,−36,−83}
 {64,−64,−64, 64}
 {36,−83, 83,−36}

8-Point DCT-II:
 {64, 64, 64, 64, 64, 64, 64, 64}
 {89, 75, 50, 18,−18,−50,−75,−89}
 {83, 36,−36,−83,−83,−36, 36, 83}
 {75,−18,−89,−50, 50, 89, 18,−75}
 {64,−64,−64, 64, 64,−64,−64, 64}
 {50,−89, 18, 75,−75,−18, 89,−50}
 {36,−83, 83,−36,−36, 83,−83, 36}
 {18,−50, 75,−89, 89,−75, 50,−18}

16-Point DCT-II:
 {64, 64, 64, 64, 64, 64, 64, 64, 64, 64, 64, 64, 64, 64, 64, 64}
 {90, 87, 80, 70, 57, 43, 25, 9, −9,−25,−43,−57,−70,−80,−87,−90}
 {89, 75, 50, 18,−18,−50,−75,−89,−89,−75,−50,−18, 18, 50, 75, 89}
 {87, 57, 9,−43,−80,−90,−70,−25, 25, 70, 90, 80, 43, −9,−57,−87}
 {83, 36,−36,−83,−83,−36, 36, 83, 83, 36,−36,−83,−83, −36, 36, 83}
 {80, 9,−70,−87,−25, 57, 90, 43,−43,−90,−57, 25, 87, 70, −9,−80}
 {75,−18,−89,−50, 50, 89, 18,−75,−75, 18, 89, 50,−50, −89,−18, 75}
 {70,−43,−87, 9, 90, 25,−80,−57, 57, 80,−25,−90, −9, 87, 43,−70}
 {64,−64,−64, 64, 64,−64,−64, 64, 64,−64,−64, 64, 64, −64,−64, 64}
 {57,−80,−25, 90, −9,−87, 43, 70,−70,−43, 87, 9,−90, 25, 80,−57}
 {50,−89, 18, 75,−75,−18, 89,−50,−50, 89,−18,−75, 75, 18,−89, 50}
 {43,−90, 57, 25,−87, 70, 9,−80, 80, −9,−70, 87,−25,−57, 90,−43}
 {36,−83, 83,−36,−36, 83,−83, 36, 36,−83, 83,−36,−36, 83,−83, 36}
 {25,−70, 90,−80, 43, 9,−57, 87,−87, 57, −9,−43, 80,−90, 70,−25}
 {18,−50, 75,−89, 89,−75, 50,−18,−18, 50,−75, 89,−89, 75,−50, 18}
 {9, −25, 43,−57, 70,−80, 87,−90, 90,−87, 80,−70, 57,−43, 25, −9}

32-Point DCT-II:
 {64,64,64,64,64,64,64,64,64,64,64,64,64,64,64,64, 64,64,64,64,64,64,64,64,64,64,64,64,64,64,64,64}
 {90,90,88,85,82,78,73,67,61,54,46,38,31,22,13,4,−4, −13,−22,−31,−38,−46,−54,−61,−67,−73,−78,−82, −85,−88,−90,−90}
 {90,87,80,70,57,43,25,9,−9,−25,−43,−57,−70,−80,−87, −90,−90,−87,−80,−70,−57,−43,−25,−9,9,25,43,57,70, 80,87,90}
 {90,82,67,46,22,−4,−31,−54,−73,−85,−90,−88,−78,−61, −38,−13,13,38,61,78,88,90,85,73,54,31,4,−22,−46, −67,−82,−90}
 {89,75,50,18,−18,−50,−75,−89,−89,−75,−50,−18,18,50, 75,89,89,75,50,18,−18,−50,−75,−89,−89,−75,−50,−18, 18,50,75,89}
 {88,67,31,−13,−54,−82,−90,−78,−46,−4,38,73,90,85,61, 22,−22,−61,−85,−90,−73,−38,4,46,78,90,82,54,13, −31,−67,−88}
 {87,57,9,−43,−80,−90,−70,−25,25,70,90,80,43,−9,−57, −87,−87,−57,−9,43,80,90,70,25,−25,−70,−90,−80,−43, 9,57,87}
 {85,46,−13,−67,−90,−73,−22,38,82,88,54,−4,−61,−90, −78,−31,31,78,90,61,4,−54,−88,−82,−38,22,73,90,67, 13,−46,−85}
 {83,36,−36,−83,−83,−36,36,83,83,36,−36,−83,−83,−36, 36,83,83,36,−36,−83,−83,−36,36,83,83,36,−36,−83, −83,−36,36,83}
 {82,22,−54,−90,−61,13,78,85,31,−46,−90,−67,4,73,88, 38,−38,−88,−73,−4,67,90,46,−31,−85,−78,−13,61,90, 54,−22,−82}
 {80,9,−70,−87,−25,57,90,43,−43,−90,−57,25,87,70,−9, −80,−80,−9,70,87,25,−57,−90,−43,43,90,57,−25,−87, −70,9,80}
 {78,−4,−82,−73,13,85,67,−22,−88,−61,31,90,54,−38, −90,−46,46,90,38,−54,−90,−31,61,88,22,−67,−85,−13, 73,82,4,−78}
 {75,−18,−89,−50,50,89,18,−75,−75,18,89,50,−50,−89, −18,75,75,−18,−89,−50,50,89,18,−75,−75,18,89,50, −50,−89,−18,75}
 {73,−31,−90,−22,78,67,−38,−90,−13,82,61,−46,−88,−4, 85,54,−54,−85,4,88,46,−61,−82,13,90,38,−67,−78,22, 90,31,−73}
 {70,−43,−87,9,90,25,−80,−57,57,80,−25,−90,−9,87,43, −70,−70,43,87,−9,−90,−25,80,57,−57,−80,25,90,9, −87,−43,70}
 {67,−54,−78,38,85,−22,−90,4,90,13,−88,−31,82,46, −73,−61,61,73,−46,−82,31,88,−13,−90,−4,90,22,−85, −38,78,54,−67}
 {64,−64,−64,64,64,−64,−64,64,64,−64,−64,64,64,−64, −64,64,64,−64,−64,64,64,−64,−64,64,64,−64,−64,64, 64,−64,−64,64}
 {61,−73,−46,82,31,−88,−13,90,−4,−90,22,85,−38,−78, 54,67,−67,−54,78,38,−85,−22,90,4,−90,13,88,−31, −82,46,73,−61}
 {57,−80,−25,90,−9,−87,43,70,−70,−43,87,9,−90,25,80, −57,−57,80,25,−90,9,87,−43,−70,70,43,−87,−9,90, −25,−80,57}
 {54,−85,−4,88,−46,−61,82,13,−90,38,67,−78,−22,90, −31,−73,73,31,−90,22,78,−67,−38,90,−13,−82,61,46, −88,4,85,−54}
 {50,−89,18,75,−75,−18,89,−50,−50,89,−18,−75,75,18, −89,50,50,−89,18,75,−75,−18,89,−50,−50,89,−18,−75, 75,18,−89,50}
 {46,−90,38,54,−90,31,61,−88,22,67,−85,13,73,−82,4, 78,−78,−4,82,−73,−13,85,−67,−22,88,−61,−31,90, −54,−38,90,−46}
 {43,−90,57,25,−87,70,9,−80,80,−9,−70,87,−25,−57,90, −43,−43,90,−57,−25,87,−70,−9,80,−80,9,70,−87,25, 57,−90,43}
 {38,−88,73,−4,−67,90,−46,−31,85,−78,13,61,−90,54, 22,−82,82,−22,−54,90,−61,−13,78,−85,31,46,−90,67, 4,−73,88,−38}
 {36,−83,83,−36,−36,83,−83,36,36,−83,83,−36,−36,83, −83,36,36,−83,83,−36,−36,83,−83,36,36,−83,83,−36, −36,83,−83,36}

{31,−78,90,−61,4,54,−88,82,−38,−22,73,−90,67,−13,
−46,85,−85,46,13,−67,90,−73,22,38,−82,88,−54,−4,
61,−90,78,−31}
{25,−70,90,−80,43,9,−57,87,−87,57,−9,−43,80,−90,70,
−25,−25,70,−90,80,−43,−9,57,−87,87,−57,9,43,−80,
90,−70,25}
{22,−61,85,−90,73,−38,−4,46,−78,90,−82,54,−13,−31,
67,−88,88,−67,31,13,−54,82,−90,78,−46,4,38,−73,
90,−85,61,−22}
{18,−50,75,−89,89,−75,50,−18,−18,50,−75,89,−89,75,
−50,18,18,−50,75,−89,89,−75,50,−18,−18,50,−75,89,
−89,75,−50,18}
{13,−38,61,−78,88,−90,85,−73,54,−31,4,22,−46,67,−82,
90,−90,82,−67,46,−22,−4,31,−54,73,−85,90,−88,78,
−61,38,−13}
{9,−25,43,−57,70,−80,87,−90,90,−87,80,−70,57,−43,
25,−9,−9,25,−43,57,−70,80,−87,90,−90,87,−80,70,
−57,43,−25,9}
{4,−13,22,−31,38,−46,54,−61,67,−73,78,−82,85,−88,
90,−90,90,−90,88,−85,82,−78,73,−67,61,−54,46,−38,
31,−22,13,−4}

FIG. 2A is an illustration of an example transform process at a video encoder, such as video encoder 130. FIG. 2B is an illustration of an example transform process at a video decoder, such as video decoder 170. In the example of FIG. 2A, video encoder 130 applies a forward primary transform 210 (fwdT), followed by a secondary transform 220 (fwdR), followed by forward quantization 230 (fwdQua). In the example of FIG. 2B, video decoder 170 applies inverse quantization 240 (invQ), followed by an inverse secondary transform 250 (invR), followed by an inverse primary transform 260 (invTran). Forward primary transform 310 may convert residual samples from a pixel domain to transform coefficients in a frequency domain. Inverse primary transform 240 may convert transform coefficients in the frequency domain to residual samples in the pixel domain.

Secondary transform 220 may be used for better energy compaction of transform coefficients. As illustrated in FIGS. 2A and 2B, secondary transform 320 may apply another transform on the transform coefficients derived from the first transform process.

As described in E. Alshina, A. Alshin, F. Fernandes, A. Saxena, V. Seregin, Z. Ma, W.-J. Han (Samsung), "CE7: Experimental results of ROT by Samsung" Joint Collaborative Team on Video Coding (JCT-VC) of ITU-T SG16 WP3 and ISO/IEC JTC1/SC29/WG11, JCTVC-E380, Geneva, CH, 16-23 Mar. 2011, a secondary transform may be a rotational transform (ROT). The ROT does not replace the primary transform. However, the ROT is applied as a secondary transform for only the low frequency part of transform coefficients matrix. With the ROT as described in the above, for each intra coded TU, an index, indicating which ROT is applied from the four pre-defined transform candidates, is signaled. A 4×4 secondary transform is applied for 4×4 intra coded TU, while 8×8 secondary transform is applied for 8×8 and larger intra coded TU. For instance, in the example, the secondary transform may be specified as follows.

$$R_{vertical}(\alpha_1, \alpha_2, \alpha_3) ==$$

$$\begin{pmatrix} \cos\alpha_1\cos\alpha_3 - & -\sin\alpha_1\cos\alpha_3 - & \sin\alpha_2\sin\alpha_3 & 0 \\ \sin\alpha_1\cos\alpha_2\sin\alpha_3 & \cos\alpha_1\cos\alpha_2\sin\alpha_3 & & \\ \cos\alpha_1\sin\alpha_3 + & -\sin\alpha_1\sin\alpha_3 + & -\sin\alpha_2\cos\alpha_3 & 0 \\ \sin\alpha_1\cos\alpha_2\cos\alpha_3 & \cos\alpha_1\cos\alpha_2\cos\alpha_3 & & \\ \sin\alpha_1\sin\alpha_2 & \cos\alpha_1\sin\alpha_2 & \cos\alpha_2 & 0 \\ 0 & 0 & 0 & 1 \end{pmatrix}$$

-continued $$R_{horizontal}(\alpha_4, \alpha_5, \alpha_6) ==$$

$$\begin{pmatrix} \cos\alpha_4\cos\alpha_6 - & -\sin\alpha_4\cos\alpha_6 - & \sin\alpha_5\sin\alpha_6 & 0 \\ \sin\alpha_4\cos\alpha_5\sin\alpha_6 & \cos\alpha_4\cos\alpha_5\sin\alpha_6 & & \\ \cos\alpha_4\sin\alpha_6 + & -\sin\alpha_4\sin\alpha_6 + & -\sin\alpha_5\cos\alpha_6 & 0 \\ \sin\alpha_4\cos\alpha_5\cos\alpha_6 & \cos\alpha_4\cos\alpha_5\cos\alpha_6 & & \\ \sin\alpha_4\sin\alpha_5 & \cos\alpha_4\sin\alpha_5 & \cos\alpha_5 & 0 \\ 0 & 0 & 0 & 1 \end{pmatrix}$$

In the four transform candidates illustrated above, one candidate corresponds to not applying a secondary transform and the other three candidates correspond to $R_{vertical}$ and $R_{horizontal}$ generated by three different settings of $\alpha 1, \alpha 2, \ldots, \alpha 6$. A more detailed description can be found in K. McCann, W.-J. Han, I.-K. Kim, J.-H. Min, E. Alshina, A. Alshin, T. Lee, J. Chen, V. Seregin, S. Lee, Y.-M. Hong, M.-S. Cheon, N. Shlyakhov, "Video coding technology proposal by Samsung (and BBC)" Joint Collaborative Team on Video Coding (JCT-VC) of ITU-T SG16 WP3 and ISO/IEC JTC1/SC29/WG11, JCTVC-A124, Dresden, Germany, 15-23 Apr. 2010.

Figure 3:
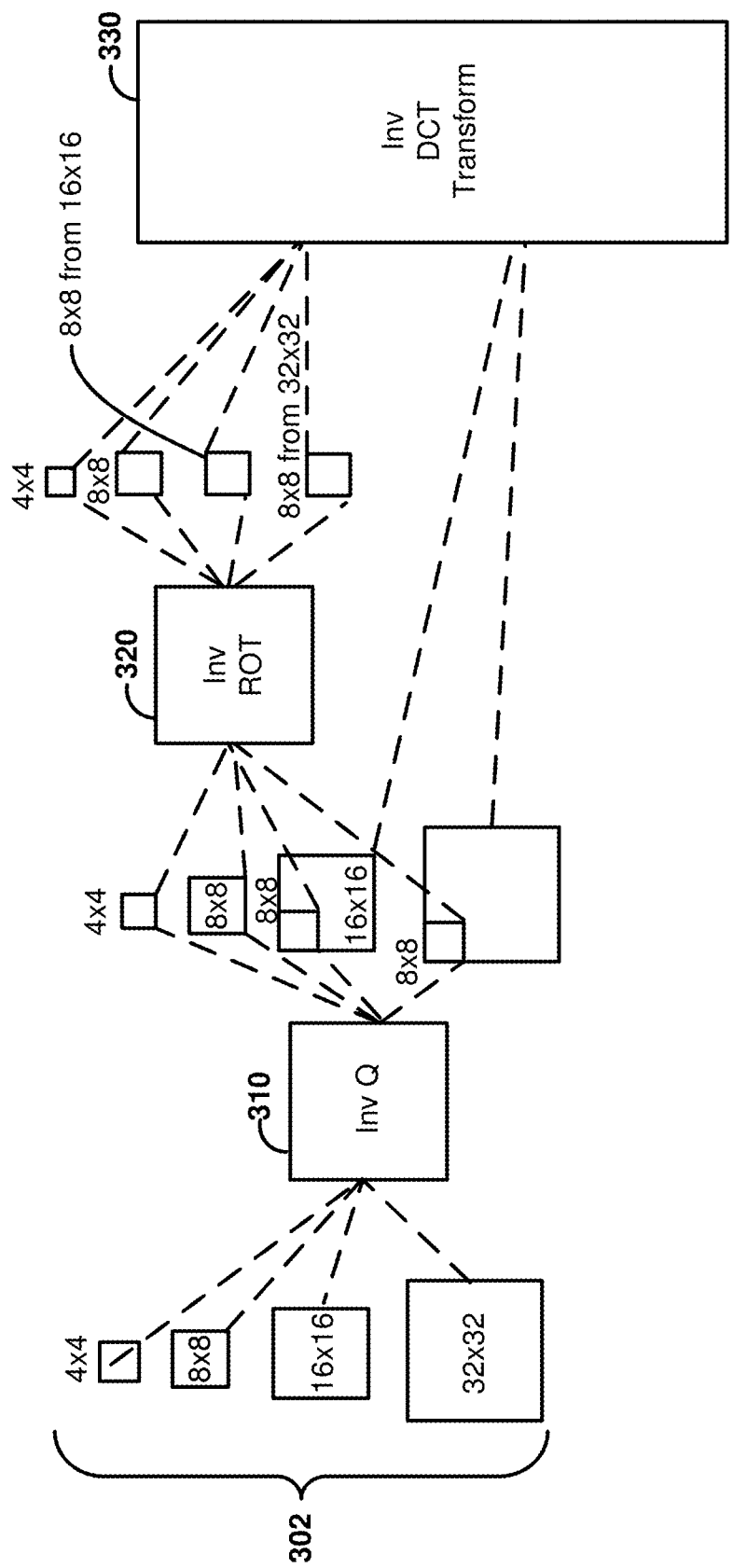
FIG. 3 is a simplified illustration of an example rotational transform applied by a video decoder.

FIG. 3 is an illustration of an example ROT applied by a video decoder, such as video decoder 170. In the example of FIG. 3, the video decoder performs inverse quantization 310 (Inv Q) on transform coefficient blocks 302 ranging in size from 4×4 to 32×32. Furthermore, in the example of FIG. 3, the video decoder applies an inverse ROT 320 (Inv ROT) as a secondary transform for only a low frequency part of transform coefficients matrices. For instance, as shown in the example of FIG. 3, all transform coefficients of 4×4 and 8×8 transform coefficient matrices may be considered to be in low frequency parts of the transform coefficient matrices. However, as shown in FIG. 3, only transform coefficients in the top left 8×8 sub-blocks of 16×16 and 32×32 transform coefficient matrices are considered to be in low frequency parts of the transform coefficient matrices. Furthermore, in the example of FIG. 3, the video decoder applies an inverse DCT transform 330 (Inv DCT transform) to transform coefficient matrices to convert the transform coefficient matrices into residual blocks. In the example of FIG. 3, prior to applying inverse DCT transform 330 to 16×16 and 32×32 transform coefficient matrices, the video decoder may replace the top left 8×8 sub-blocks of the 16×16 and 32×32 transform coefficient matrices with the corresponding 8×8 transform coefficient matrices produced by application of inverse ROT 320.

As described in E. Alshina, A. Alshin, J.-H. Min, K. Choi, A. Saxena, M. Budagavi, "Known tools performance investigation for next generation video coding", ITU-T SG16 Doc. VCEG-AZ05, June 2015, ROT may be extended to a whole TU, not only the low-frequency part. More specifically, three 4×4 separable secondary transform candidates may be pre-defined, and the selected one may be explicitly signaled with a 2-bit index at the CU-level. The 2-bit index may be referred to herein as a ROT index. In one example, when the ROT index is 0, no secondary transform is applied. However, in this example, when the ROT index is 1, 2 and 3, the secondary transform corresponding to one of the three pre-defined secondary transform candidates may be applied for every TU inside a current CU. Given a selected secondary transform, for every 4×4 sub-block of the current TU, a secondary 4×4 separable secondary transform may be applied.

In U.S. provisional application No. 62/234,644 filed Sep. 29, 2015, U.S. provisional application No. 62/294,897 filed Feb. 12, 2016, U.S. provisional application No. 62/323,496 filed Apr. 15, 2016, U.S. provisional application No. 62/337,736 filed May 17, 2016, U.S. patent application Ser. No. 15/270,455 filed Sep. 20, 2016, and U.S. patent application Ser. No. 15/270,507 filed Sep. 20, 2016 a mode dependent non-separable secondary transform (MDNSST, or as known as NSST) is applied between the forward core transform and quantization at the encoder and between the de-quantization and inverse core transform at the decoder.

Figures 4A, 4B:
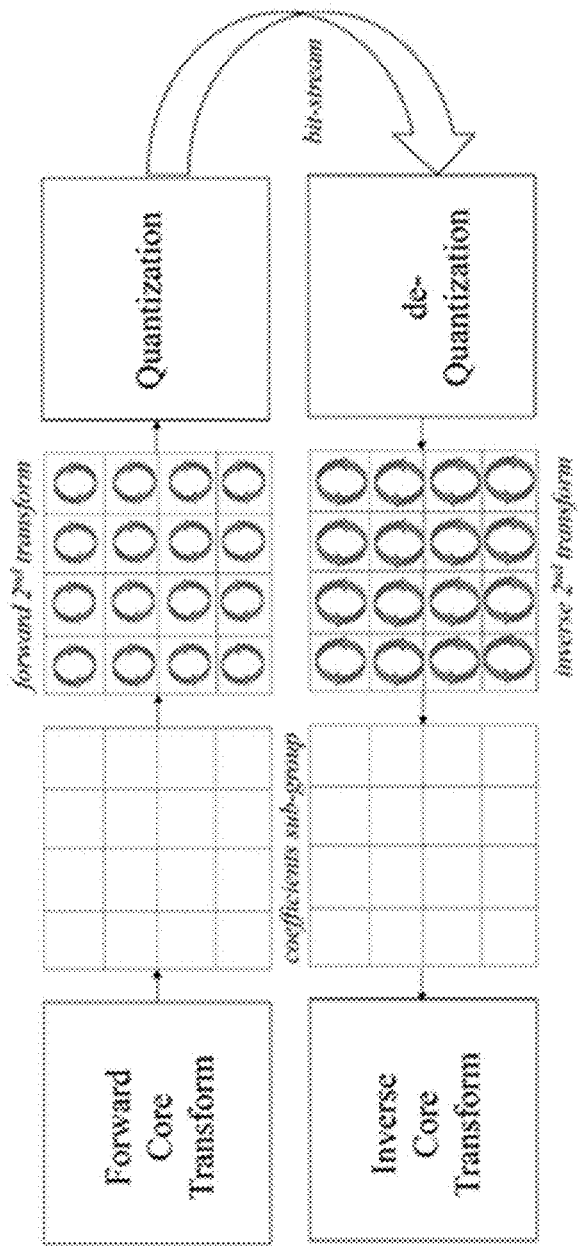
FIG. 4A is a simplified illustration of an example non-separable transform by an encoder and inverse non-separable transform by a decoder.
FIG. 4B is a simplified illustration of an example mapping from luma intra mode to transform set index.

FIG. 4A is an example application of a non-separable secondary transform performed independently for each 4×4 sub-group of transform coefficients within an intra-coded CU. Application of the non-separable transform is described using input block X as an example. To apply the non-separable transfer, the 4×4 input block X:

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform may be calculated as $\vec{F} = T \cdot \vec{X}$, where $\vec{F}$ indicates the transform coefficient vector, and T is a transform matrix, for example a 16×16 transform matrix. The 16×1 coefficient vector $\vec{F}$ may be re-organized as 4×4 block using the scanning order for that block (horizontal, vertical or diagonal). The coefficients with smaller index are generally placed with the smaller scanning index in the 4×4 coefficient block.

In some implementations, there are 11×3(for directional modes)6+1×2(for non-directional modes) non-separable transform matrices, where 11 represents the number of transform sets for the directional intra prediction mode where each transform set includes 3 transform matrices. While for non-directional modes, i.e., Planar, DC and LM, one transform set may be applied which includes 2 transform matrices. FIG. 4B is an illustration of an example mapping from luma intra mode to transform set index.

In the example, the transform set applied to luma/chroma transform coefficients is specified by the corresponding luma/chroma intra prediction modes, according to FIG. 4B. Given the selected transform set, the index of the selected non-separable secondary transform may be signaled if there are more than a certain number (e.g., 2) of non-zero coefficients in the current coefficient block. Otherwise (the number of non-zero coefficients is less than or equal to a certain number, e.g., 2), MDNSST is not applied and the index is not signaled or assumed to be not signaled.

For each transform set, the selected non-separable secondary transform candidate may be further specified by the explicitly signalled CU-level MDNSST index. In an example, the index may be signalled in a bit-stream once per Intra CU after transform coefficients and truncated unary banalization is used. In an example, the truncated value is 2 in case of planar or DC mode, and 3 for angular intra prediction mode. This MDNSST index may be signalled when there is more than one non-zero coefficient in a CU. The default value is zero when it is not signalled. Zero value of this syntax element indicates secondary transform is not applied to the current CU, values 1-3 indicates which secondary transform from the set should be applied.

In JEM, MDNSST is not applied for a block coded with transform skip mode. When MDNSST index is signalled for a CU and not equal to zero, MDNSST is not be used for a block of a component that is coded with transform skip mode in the CU. When a CU with blocks of all components coded in transform skip mode, MDNSST index is not signalled for the CU. In JEM, MDNSST is only applied for the top-left 8×8 (low-frequency) primary transform coefficients, for the coefficients outside the top-left 8×8 region, the original primary transform coefficients are kept unchanged.

As described in X. Zhao, A. Said, V. Seregin, M. Karczewicz, J. Chen, "EE2.7 related: Improved non-separable secondary transform", Joint Video Exploration Team (JVET) of ITU-T SG 16 WP 3 and ISO/IEC JTC 1/SC 29/WG 11, Doc. JVET-00063, the non-separable secondary transform is extended for 8×8, resulting in better coding performance, i.e., non-separable transform applied on 8×8 block size may be used as secondary transform for primary transform coefficient block with both height and width being larger than or equal to 8.

Figure 5A:
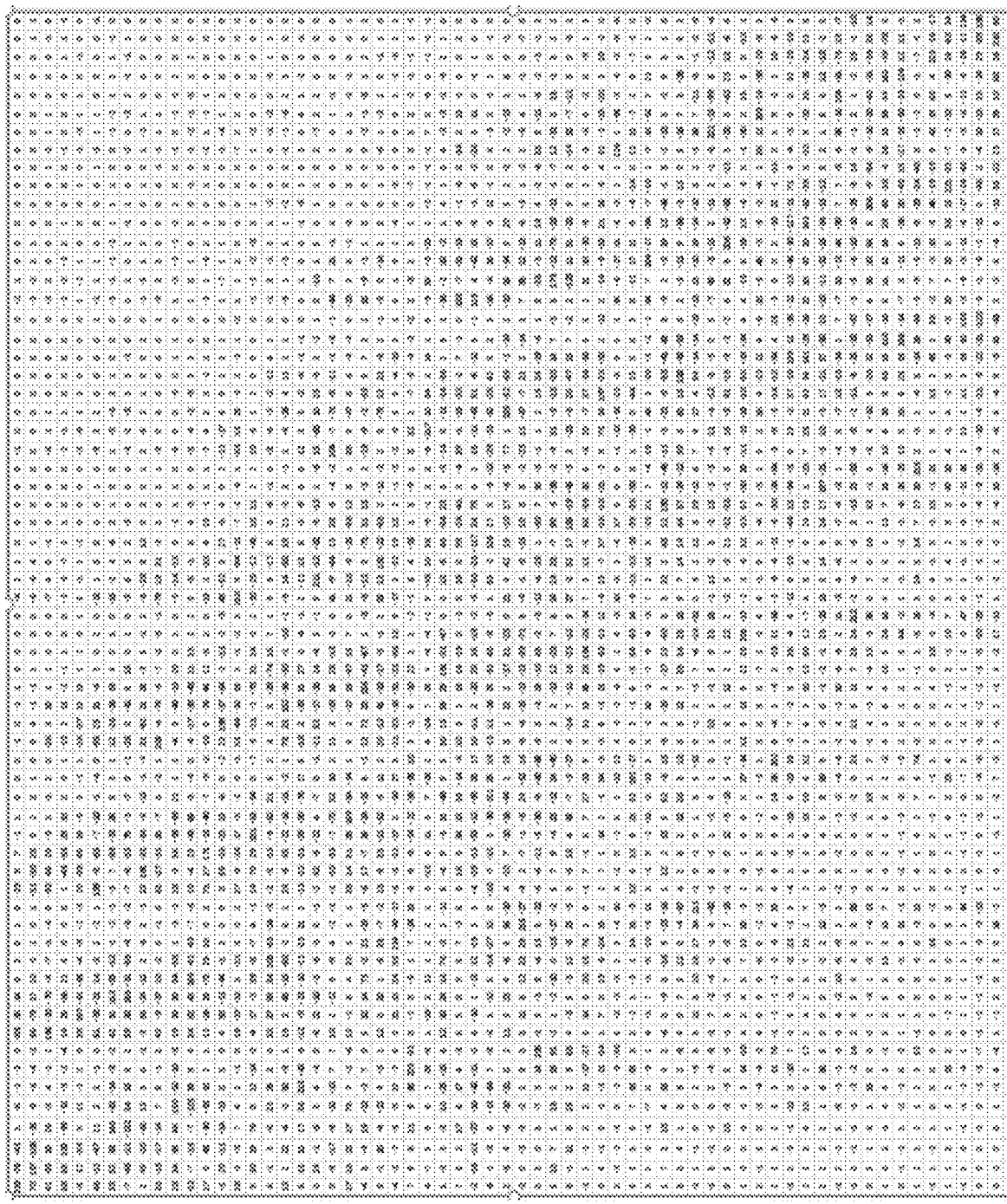
FIG. 5A is a simplified illustration of a non-separable transform matrix.

Non-separable transform matrices are typically sparse, meaning a small number of coefficients show large absolute values. FIG. 5A shows an example 8×8 non-separable matrix, which is a 64×64 matrix. In this example, the first row has 11 out of 64 coefficients having magnitudes larger than 3, while the majority of coefficients are small, for example −2 to 2.

Figure 5B:
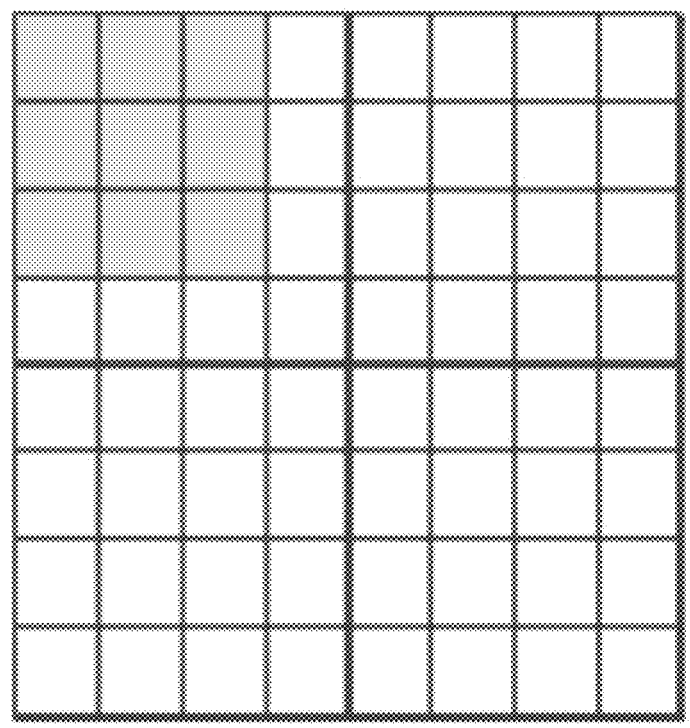
FIG. 5B is a simplified illustration of a non-separable transform matrix in the spatial domain.

It can be observed that for a row of the above non-separable transform matrix, the dominant (relatively large magnitudes) coefficients are generally close to each other after mapping their coordinates to the spatial domain. For example, the first row has large coefficients located at 0 (219), 1(−76), 2(−43), 8(−85), 9(35), 10(14), 16(−29), 17(9), 18(7), which corresponds to the following 2-D spatial coordinates in an 8×8 block; (0,0), (0,1), (0,2), (1,0), (1,1), (1,2), (2,0), (2,1), (2,2), i.e., the shaded positions in an 8×8 block shown in FIG. 5B.

Based on this characteristic of non-separable transform matrices, it is possible to benefit from more compact representation of non-separable transform matrices. The memory used for storing non-separable transform matrices can be reduced. The technique provides greater memory storage savings for larger non-separable transform sizes.

The design of transforms may apply a non-separable transform as the primary transform, secondary transform, or multiple transforms.

Figure 6:
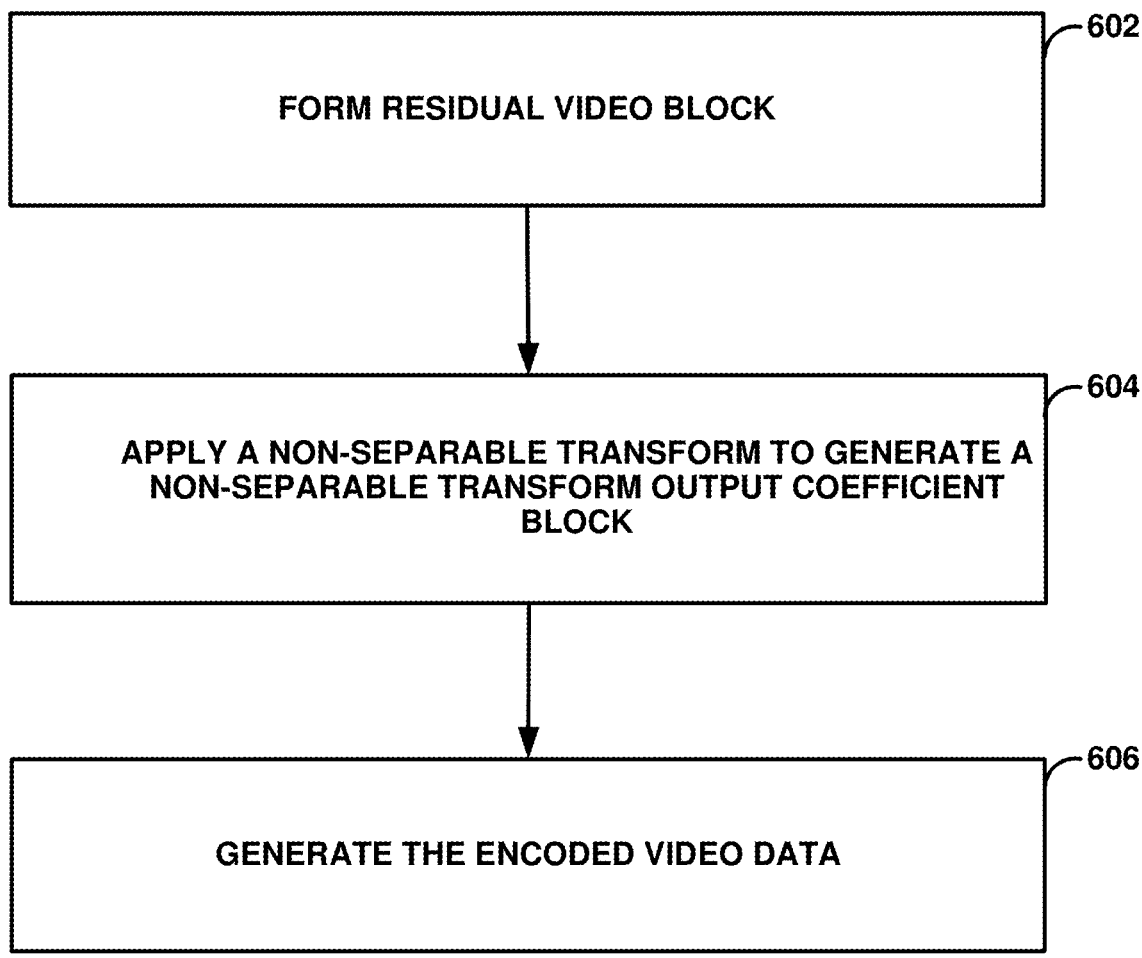
FIG. 6 is a simplified flow diagram illustrating an example of a video encoder that may implement techniques described in this disclosure.
Figure 7:
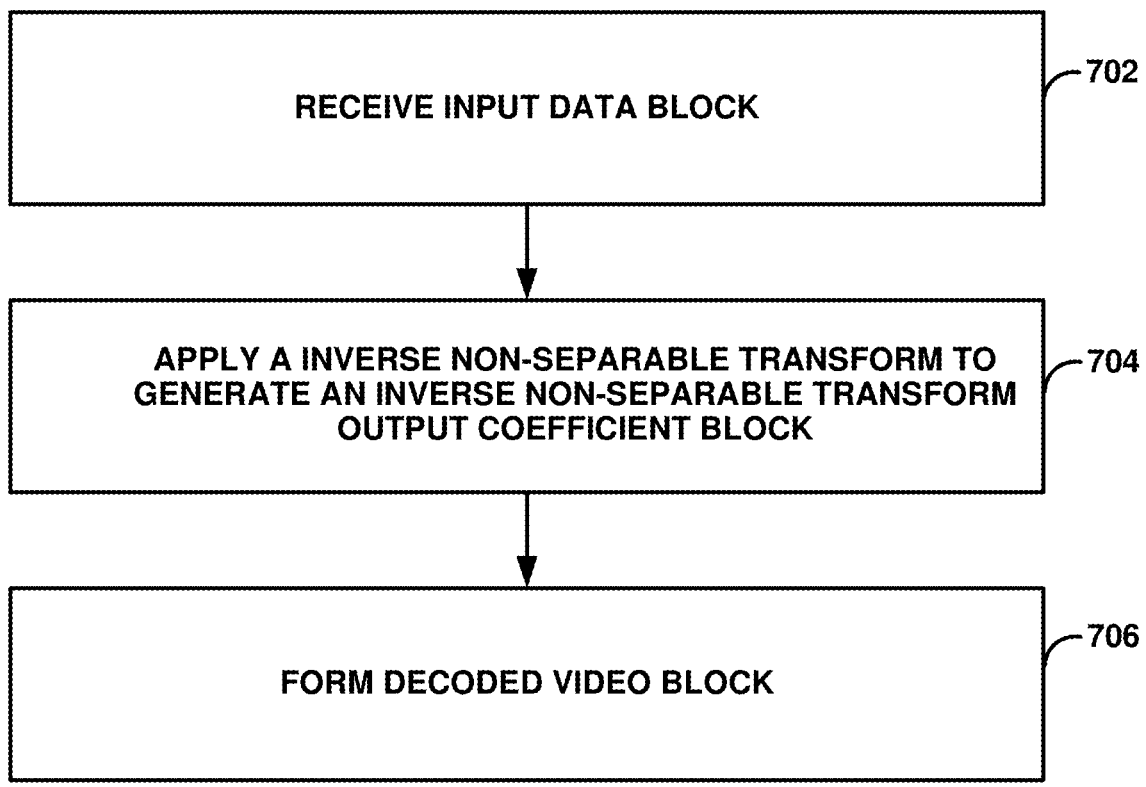
FIG. 7 is a simplified flow diagram illustrating an example of a video decoder that may implement techniques described in this disclosure.

FIGS. 6 and 7 are simplified flowcharts of an exemplary embodiment of a method of encoding (and decoding) video data based on a non-separable transform. FIG. 6 is a flowchart that illustrates the steps in general terms of the video encoder 130. FIG. 7 is a flowchart that illustrates the steps in general terms of the video decoder 170.

In an embodiment, the method begins at block 602 where a residual video block is formed. The residual video block may be based on subtracting at least one predictive block from a video block being coded.

After forming the residual video block, the technique proceeds to block 604, where the video encoder applies a non-separable transform to at least a part of the residual video block to generate a non-separable transform output coefficient. In another embodiment, the video encoder is configured to apply multiple transforms, including a first and second transform. In an aspect of this embodiment, the first transform is a separable transform (such as a KLT) and the second transform is a non-separable transform. In this example, the first transform is applied to the residual video block to generate a first transform output coefficient block. The first transform converts the residual video block from a pixel domain to a frequency domain. As used herein, a pixel domain or a spatial domain may refer to domains where changes in a value for a pixel correspond to changes in the luminance and/or color for that pixel. As used herein, however, a frequency domain may refer to a domain where changes in a value for a pixel correspond to changes in a rate at which the pixel values for the pixel are changing in the pixel domain. Next, a non-separable transform may be applied to at least a part of the first transform output coefficient block (e.g. 2-D) to generate a non-separable transform output coefficient block. This may be represented by $$\vec{F} = T \cdot \vec{X}$$

where T represents the M×N secondary non-separable transform matrix, $\vec{F}$ represents the output secondary transform coefficients, also referred to as the non-separable transform output coefficient block, and $\vec{X}$ is the vectorized X, of a 2-D first transform output coefficient block generated by the first transform.

Based on the observation described above, the non-separable transform matrix having characteristics of being sparse and the coordinates of large coefficients of each row in the transform matrix T being close to each other in the 2-D spatial coordinates, an approximation of the calculation of the non-separable transform as a technique with a limited size window is described below.

The video encoder 130 may be configured to determine a non-separable transform coefficient, in other words, a sample of $\vec{F}$ by assigning a window on the input 2-D block, assign a weight for each position inside the assigned window, and determine the non-separable transform output coefficient block based on the assigned weights.

FIGS. 8A through 8E illustrate various window shapes that may be assigned, including square, rectangle, triangle, diamond, and arbitrary pre-defined. While described as triangle and diamond, one skilled in the art will understand these shapes represent triangle like and diamond like shapes. While one arbitrary pre-defined shape is illustrated in FIG. 8A, one skilled in the art will understand the arbitrary pre-defined shape may take on a number of varying shapes. In another embodiment, the assigned window may be based on an index of the non-separable transform output coefficient. In another embodiment, the assigned window may be based on decoded information, wherein the decoded information comprises information based on at least one of intra mode, block size, block shape, block height, block width, QP, or a number of nonzero coefficients of a first coefficient block. In an aspect of this embodiment, the number of nonzero coefficients of a first coefficient block is the output of a first transform, the first transform may be a separable or non-separable transform.

Once a coefficient, which may represent a selected transform basis for quantized transform basis, also referred to as a weight, is assigned for each position within the assigned window, the non-separable transform output coefficient block may be determined. In an embodiment, the non-separable transform output coefficient block may be determined by calculating the weighted sum of the input data blocks in the assigned window, wherein the input data blocks are weighted by the corresponding assigned weight in the same position. In one aspect of this embodiment, the input data block comprises the residual video block. In another aspect of this embodiment, the input data block comprises the first transform output coefficient block generated from applying a first transform to the residual video block.

Figure 9:
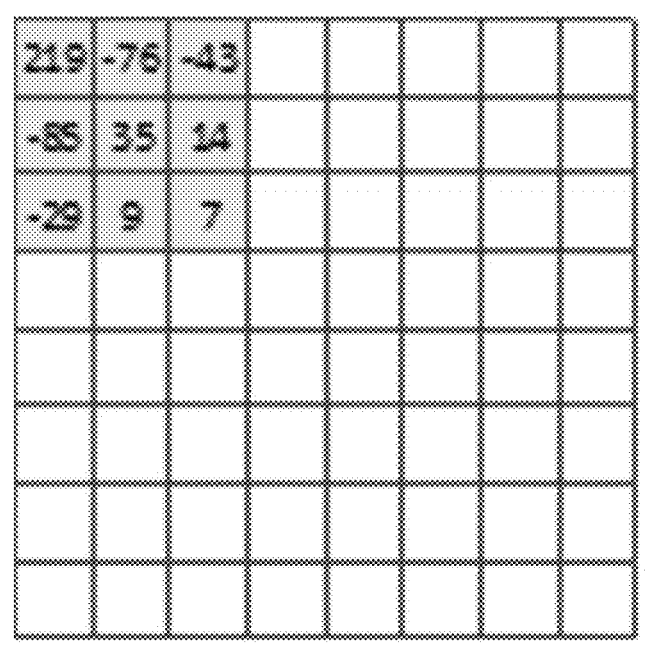

FIG. 9 illustrates an example of a window applied to input data block with assigned weights. In this example, to calculate the non-separable transform coefficient for an 8×8 input data block, a 3×3 window may be assigned, and the weights are assigned (e.g., numbers within the positions). In this embodiment, the output of filtering (the non-separable transform output coefficient block) may be calculated as a sum of multiplications:

$$\vec{F}(m) = \Sigma_{i=W_{x0}}^{W_{x1}} \Sigma_{j=W_{y0}}^{W_{y1}} \uparrow_m (i,j) \cdot X(i,j),$$

where $(W_{x0}, W_{y0})$ and $(W_{x1}, W_{y1})$ are the coordinates of the top-left and bottom-right of the assigned window for calculating the $m^{th}$ filtering output.

After the applying a non-separable transform, the video encoder 130 proceeds to block 606, where encoded video data may be generated based on the determined non-separable transform output coefficient block. In one embodiment, a quantization unit may be configured to quantize the non-separable transform output coefficient block. In an example, the non-separable transform output coefficient block may be a 2-dimensional coefficient block, which may be quantized by the quantization unit to form quantized transform coefficients.

In a multiple transform embodiment, the number of nonzero coefficients of the first coefficient block within a sub-block of the first coefficient block may be determined and compared to a threshold. In one example, the first coefficient block may be generated as the output of the first transform, which in one aspect of this example may be a separable transform. In an example, the NSST signaling may depend on how many nonzero coefficients are transmitted. For example, when there are less than a threshold (e.g., 2) of nonzero coefficients, NSST index may not be signaled and may be derived as 0. Rather than counting the total number of nonzero coefficients inside the whole transform coefficient block, only the nonzero coefficients of the first coefficient block within a subblock of the first coefficient block may be counted and considered for signaling NSST index. In another example, when there are more than a threshold (e.g., 2) of nonzero coefficients, NSST index may be signaled, wherein the non-separable output coefficient block is determined.

As mentioned above, video decoder 170 performs a similar, albeit reciprocal, process to that performed by video encoder 130. FIG. 7 is a flowchart that illustrates the steps in general terms of the video decoder 170.

In an embodiment, the method begins at block 702 where an input data block may be received. In one embodiment, the input data block may be generated by inverse quantization or the output of inverse quantization. In another embodiment the input data block may be generated from the encoder 130, without inverse quantization. In one example of this embodiment, the input data block may be generated from the transform processing unit 1052. In another example of this embodiment, the input data block may be generated from the entropy encoding unit 1056.

After receiving the input data block, the technique proceeds to block 704, where the video decoder applies an inverse non-separable transform to at least a part of the input data block to generate an inverse non-separable transform output coefficient block. In another embodiment, the video decoder may be configured to apply multiple inverse transforms, including a first inverse transform and second inverse transform. In an aspect of this embodiment, the second inverse transform (which may be the applied prior to the first inverse transform in the video decoder), may be an inverse non-separable transform; and the first inverse transform may be a separable inverse transform. In this example, the inverse non-separable transform may be applied to the input data block to generate an inverse non-separable transform output coefficient block. Next, an inverse separable transform may be applied to at least a part of the inverse non-separable transform output coefficient block to generate a residual video block. The residual video block generated may be a reconstructed residual video block of the residual block formed in the video encoder.

Similar to the video encoder, the video decoder may be configured to determine an inverse non-separable transform output coefficient block based on assigning a window, assigning a weight for each position inside the assigned window, and determining the inverse non-separable transform output coefficient block as described in greater detail above.

After applying one or more inverse transforms, the video decoder 170 proceeds to block 706, where a decoded video block may be formed based on the determined inverse non-separable transform output coefficient block. In one example of multiple transform embodiment, the decoded video block may be formed based on the output from the inverse separable transform, which may be based on the output of the inverse non-separable transform applied prior to the inverse separable transform. Alternative multiple transform and multiple inverse transform embodiment may comprise applying multiple non-separable transforms and the corresponding multiple inverse non-separable transforms.

Figure 10:
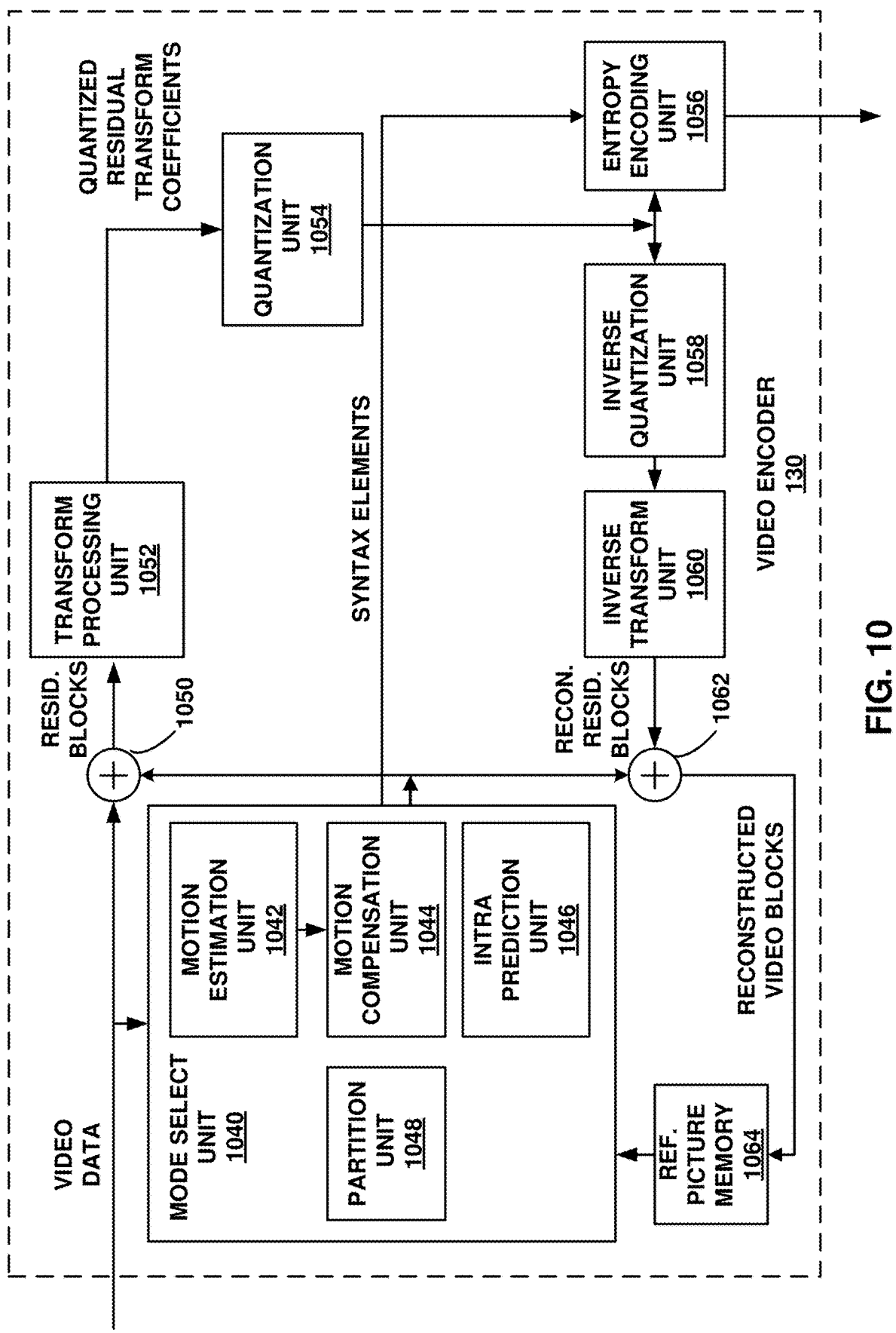
FIG. 10 is a simplified block diagram illustrating an example of a video encoder that may implement techniques described in this disclosure.

FIG. 10 is a block diagram illustrating an example of video encoder 130 that may implement techniques described in this disclosure. In accordance with this disclosure, video encoder 130 may be configured to apply the techniques described in this disclosure, such as, for example, techniques relating to non-separable transforms. Video encoder 130 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 10, video encoder 130 receives a current video block within a video frame to be encoded. In the example of FIG. 10, video encoder 130 includes mode select unit 1040, reference picture memory 1064 (which may also be referred to as a decoded picture buffer (DPB)), summer 1050, transform processing unit 1052, quantization unit 1054, and entropy encoding unit 1056. Mode select unit 1040, in turn, includes motion compensation unit 1044, motion estimation unit 1042, intra-prediction unit 1046, and partition unit 1048. For video block reconstruction, video encoder 130 also includes inverse quantization unit 1058, inverse transform unit 1060, and summer 1062. In some examples, a deblocking filter (not shown in FIG. 8) is also included to filter block boundaries to remove blockiness artifacts from reconstructed video. The deblocking filter filters the output of summer 1062. Additional filters (in loop or post loop) may also be used in addition to the deblocking filter. Such filters are not shown for brevity, but if desired, may filter the output of summer 1050 (as an in-loop filter).

During the encoding process, video encoder 130 receives a video frame or slice to be coded. The frame or slice may be divided into multiple video blocks. Motion estimation unit 1042 and motion compensation unit 1044 perform inter-predictive encoding of the received video block relative to one or more blocks in one or more reference frames to provide temporal prediction. Alternatively, intra-prediction unit 1046 may perform intra-predictive encoding of the received video block relative to one or more neighboring blocks in the same frame or slice as the block to be coded to provide spatial prediction. Video encoder 130 may perform multiple coding passes, e.g., to select an appropriate coding mode for each block of video data.

Moreover, partition unit 1048 may partition blocks of video data into sub-blocks, based on evaluation of previous partitioning schemes in previous coding passes. For example, partition unit 1048 may initially partition a frame or slice into LCUs, and partition each of the LCUs into sub-CUs based on rate-distortion analysis (e.g., rate-distortion optimization). Mode select unit 1040 may further produce a quadtree data structure indicative of partitioning of an LCU into sub-CUs. Leaf-node CUs of the quadtree may include one or more PUs and one or more TUs.

Mode select unit 1040 may select one of the prediction modes, intra or inter, e.g., based on error results, and provides the resulting predicted block to summer 250 to generate residual data and to summer 1062 to reconstruct the encoded block for use as a reference frame. Mode select unit 1040 also provides syntax elements, such as motion vectors, intra-mode indicators, partition information, and other such syntax information, to entropy encoding unit 1056.

Motion estimation unit 1042 and motion compensation unit 1044 may be highly integrated but are illustrated separately for conceptual purposes. Motion estimation, performed by motion estimation unit 1042, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 130 may calculate values for sub-integer pixel positions of reference pictures stored in reference picture memory 1064. For example, video encoder 130 may interpolate values of one-quarter pixel positions, one-eighth pixel positions, or other fractional pixel positions of the reference picture. Therefore, motion estimation unit 1042 may perform a motion search relative to the full pixel positions and fractional pixel positions and output a motion vector with fractional pixel precision.

Motion estimation unit 1042 calculates a motion vector for a PU of a video block in an inter-coded slice by comparing the position of the PU to the position of a predictive block of a reference picture. The reference picture may be selected from a first reference picture list (list 0) or a second reference picture list (list 1), each of which identify one or more reference pictures stored in reference picture memory 1064. Motion estimation unit 1042 sends the calculated motion vector to entropy encoding unit 1056 and motion compensation unit 1044.

Motion compensation, performed by motion compensation unit 1044, may involve fetching or generating the predictive block based on the motion vector determined by motion estimation unit 1042. Again, motion estimation unit 1042 and motion compensation unit 1044 may be functionally integrated, in some examples. Upon receiving the motion vector for the PU of the current video block, motion compensation unit 1044 may locate the predictive block to which the motion vector points in one of the reference picture lists. Summer 1050 forms a residual video block by subtracting pixel values of the predictive block from the pixel values of the current video block being coded, forming pixel difference values, as discussed below. In general, motion estimation unit 1042 performs motion estimation relative to luma components, and motion compensation unit 1044 uses motion vectors calculated based on the luma components for both chroma components and luma components. Mode select unit 1040 may also generate syntax elements associated with the video blocks and the video slice for use by video decoder 170 in decoding the video blocks of the video slice.

Intra-prediction unit 1046 may intra-predict a current block, as an alternative to the inter-prediction performed by motion estimation unit 1042 and motion compensation unit 1044, as described above. In particular, intra-prediction unit 1046 may determine an intra-prediction mode to use to encode a current block. In some examples, intra-prediction unit 1046 may encode a current block using various intra-prediction modes, e.g., during separate encoding passes, and intra-prediction unit 1046 (or mode select unit 1040, in some examples) may select an appropriate intra-prediction mode to use from the tested modes.

For example, intra-prediction unit 1046 may calculate rate-distortion values using a rate-distortion analysis for the various tested intra-prediction modes and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 1046 may calculate ratios from the distortions and rates for the various encoded blocks to determine which intra-prediction mode exhibits the best rate-distortion value for the block.

After selecting an intra-prediction mode for a block, intra-prediction unit 1046 may provide information indicative of the selected intra-prediction mode for the block to entropy encoding unit 1056. Entropy encoding unit 1056 may encode the information indicating the selected intra-prediction mode. Video encoder 130 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 130 forms a residual video block by subtracting the prediction data from mode select unit 1040 from the original video block being coded. Summer 1050 represents the component or components that perform this subtraction operation. Transform processing unit 1052 applies a transform, such as a discrete cosine transform (DCT) or a conceptually similar transform, to the residual block, producing a video block comprising transform coefficient values. Wavelet transforms, integer transforms, sub-band transforms, DSTs, or other types of transforms could be used instead of a DCT. In any case, transform processing unit 252 applies the transform to the residual block, producing a block of transform coefficients. The transform may convert the residual information from a pixel domain to a transform domain, such as a frequency domain.

Additionally, as discussed above, transform processing unit 1052 may be configured to apply a non-separable transform. In some examples, transform processing unit 1052 may be configured to assign a window, assign a weight for each position inside the window, and determining the non-separable transform output coefficient block based on the assigned weights. Transform processing unit 252 may send the resulting transform coefficients to quantization unit 254.

Quantization unit 1054 quantizes the transform coefficients to further reduce bit rate. The quantization process may reduce the bit depth associated with some or all of the coefficients. The degree of quantization may be modified by adjusting a quantization parameter.

Following quantization, entropy encoding unit 1056 scans and entropy encodes syntax elements indicating the quantized transform coefficients. For example, entropy encoding unit 256 may perform CAVLC, CABAC, SBAC, PIPE coding or another entropy coding technique. In the case of context-based entropy coding, context may be based on neighboring blocks. Following the entropy coding by entropy encoding unit 1056, the encoded bitstream may be transmitted to another device (e.g., video decoder 170) or archived for later transmission or retrieval.

Inverse quantization unit 1058 and inverse transform unit 1060 apply inverse quantization and inverse transformation, respectively, to reconstruct the residual block in the pixel domain. In particular, summer 1062 adds the reconstructed residual block to the motion compensated prediction block earlier produced by motion compensation unit 1044 or intra-prediction unit 1046 to produce a reconstructed video block for storage in reference picture memory 1064. The reconstructed video block may be used by motion estimation unit 1042 and motion compensation unit 1044 as a reference block to inter-code a block in a subsequent video frame.

Video encoder 130 generally uses the process discussed above to encode each block of each picture in a coded video sequence. In addition, in some examples, video encoder 130 may determine temporal layers to which to assign each of the pictures. Furthermore, video encoder 130 may be configured to encode pictures of other layers, e.g., other views, scalable video coding layers, or the like. In any case, video encoder 130 may further encode data indicating a layer to which each picture belongs, for one or more layers (e.g., of various video dimensions).

Figure 11:
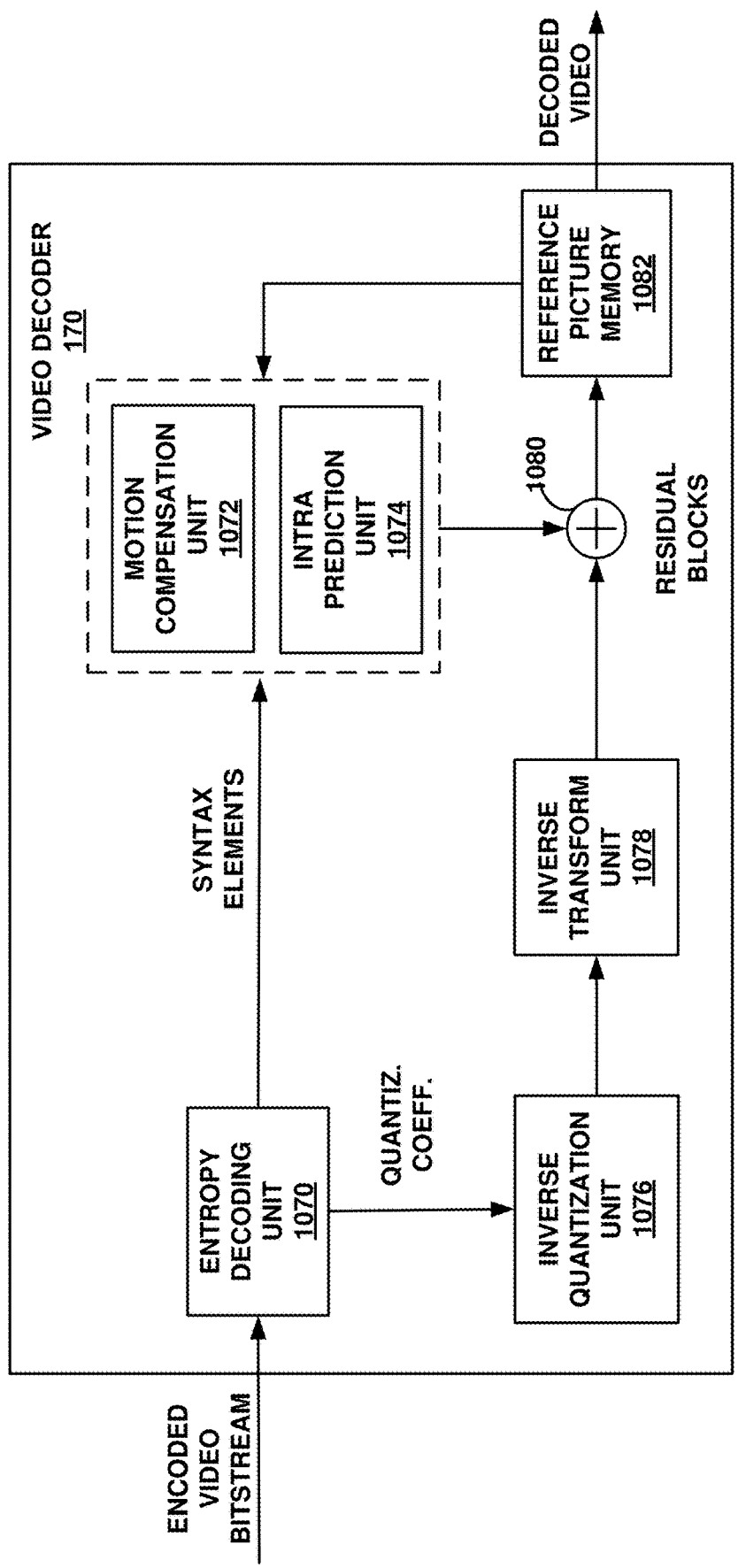
FIG. 11 is a simplified block diagram illustrating an example of a video decoder that may implement techniques described in this disclosure.

FIG. 11 is a block diagram illustrating an example of video decoder 170 that may implement techniques described in this disclosure. In accordance with this disclosure, video decoder 170 may be configured to apply the techniques described in this disclosure, such as, for example, techniques relating to non-separable transforms. In the example of FIG. 11, video decoder 170 includes an entropy decoding unit 1070, motion compensation unit 1072, intra prediction unit 1074, inverse quantization unit 1076, inverse transformation unit 1078, reference picture memory 1082, and summer 1080. Video decoder 170 may, in some examples, perform a decoding pass generally reciprocal to the encoding pass described with respect to video encoder 130 (FIG. 10). Motion compensation unit 1072 may generate prediction data based on motion vectors received from entropy decoding unit 1070, while intra prediction unit 1074 may generate prediction data based on intra-prediction mode indicators received from entropy decoding unit 1070.

During the decoding process, video decoder 170 receives an encoded video bitstream that represents video blocks of an encoded video slice and associated syntax elements from video encoder 130. Entropy decoding unit 1070 of video decoder 170 entropy decodes the bitstream to generate quantized coefficients, motion vectors or intra-prediction mode indicators, and other syntax elements. Entropy decoding unit 1070 forwards the motion vectors to and other syntax elements to motion compensation unit 1072. Video decoder 170 may receive the syntax elements at the video slice level and/or the video block level.

When the video slice is coded as an intra-coded (I) slice, intra prediction unit 1074 may generate prediction data for a video block of the current video slice based on a signaled intra prediction mode and data from previously decoded blocks of the current frame or picture. When the video frame is coded as an inter-coded (i.e., B, P or a generalized P and B-picture (GPB)) slice, motion compensation unit 1072 produces predictive blocks for a video block of the current video slice based on the motion vectors and other syntax elements received from entropy decoding unit 1070. The predictive blocks may be produced from one of the reference pictures within one of the reference picture lists. Video decoder 170 may construct the reference frame lists, list 0 and list 1, using default construction techniques based on reference pictures stored in reference picture memory 1082. Motion compensation unit 1072 determines prediction information for a video block of the current video slice by parsing the motion vectors and other syntax elements and uses the prediction information to produce the predictive blocks for the current video block being decoded. For example, motion compensation unit 1072 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 1072 may also perform interpolation based on interpolation filters. Motion compensation unit 1072 may use interpolation filters as used by video encoder 130 during encoding of the video blocks to calculate interpolated values for sub-integer pixels of reference blocks. In this case, motion compensation unit 1072 may determine the interpolation filters used by video encoder 130 from the received syntax elements and use the interpolation filters to produce predictive blocks.

Inverse quantization unit 1076 inverse quantizes, i.e., de-quantizes, the quantized transform coefficients provided in the bitstream and decoded by entropy decoding unit 1070. The inverse quantization process may include use of a quantization parameter $QP_Y$ calculated by video decoder 170 for each video block in the video slice to determine a degree of quantization and, likewise, a degree of inverse quantization that should be applied.

Inverse transform unit 1078 applies an inverse transform, e.g., an inverse DCT, an inverse integer transform, or a conceptually similar inverse transform process, to the transform coefficients in order to produce residual blocks in the pixel domain. Additionally, in accordance with various techniques of this disclosure, inverse transform unit 1078 may be configured to apply an inverse non-secondary transform. The inverse transform unit 1078 may be configured to assign a window, assign a weight for each position inside the window, and determine the inverse non-separable transform output coefficient block based on the assigned weights.

After motion compensation unit 1072 generates the predictive block for the current video block based on the motion vectors and other syntax elements, video decoder 170 forms a decoded video block by summing the residual blocks from inverse transform unit 1078 with the corresponding predictive blocks generated by motion compensation unit 1072. Summer 1080 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 1082, which stores reference pictures used for subsequent motion compensation. Reference picture memory 1082 also stores decoded video for later presentation on a display device, such as display device 160 of FIG. 1.

Video decoder 170 generally uses the process discussed above to decode each block of each picture in a coded video sequence. In addition, in some examples, video decoder 170 may decode data indicating temporal layers to which pictures are assigned. Furthermore, video decoder 170 may be configured to decode pictures of other layers, e.g., other views, scalable video coding layers, or the like. In any case, video decoder 170 may further decode data indicating a layer to which each picture belongs, for one or more layers (e.g., of various video dimensions).

The techniques of the disclosure, which may be performed by video encoder 130 or video decoder 170, are described in more detail below.

Figure 12A:
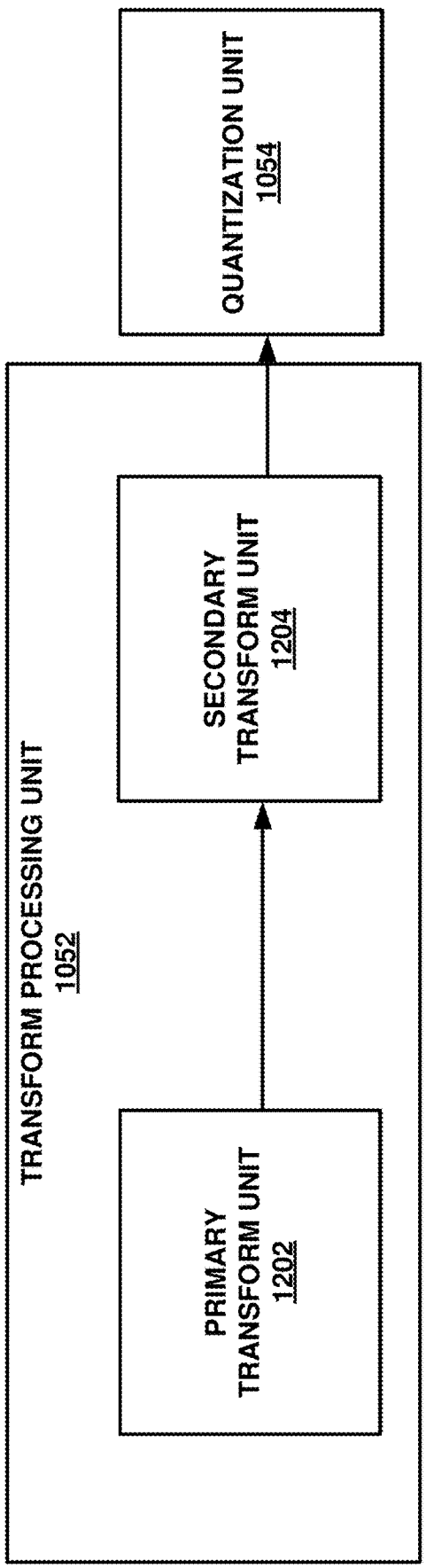
FIG. 12A is a simplified illustration of an example transform processing by a video encoder, in accordance with one or more techniques described in this disclosure.

FIG. 12A is an illustration of an example transform processing by video encoder 130, in accordance with one or more techniques described in this disclosure. In the example of FIG. 12A, transform processing unit 1052 of video encoder 130 comprises a primary transform unit 1202, and a secondary transform unit 1204. Primary transform unit 1202 applies a primary transform, such as, for example, DST or DCT, on a residual block to generate a 2-dimensional coefficient block. Secondary transform unit 1204 applies a non-separable transform, which includes assigning a window, assigning a weight for each position inside the window, and determining the non-separable transform output coefficient block based on the assigned weights. Quantization unit 1054 quantizes the 2-dimensional block.

Figure 12B:
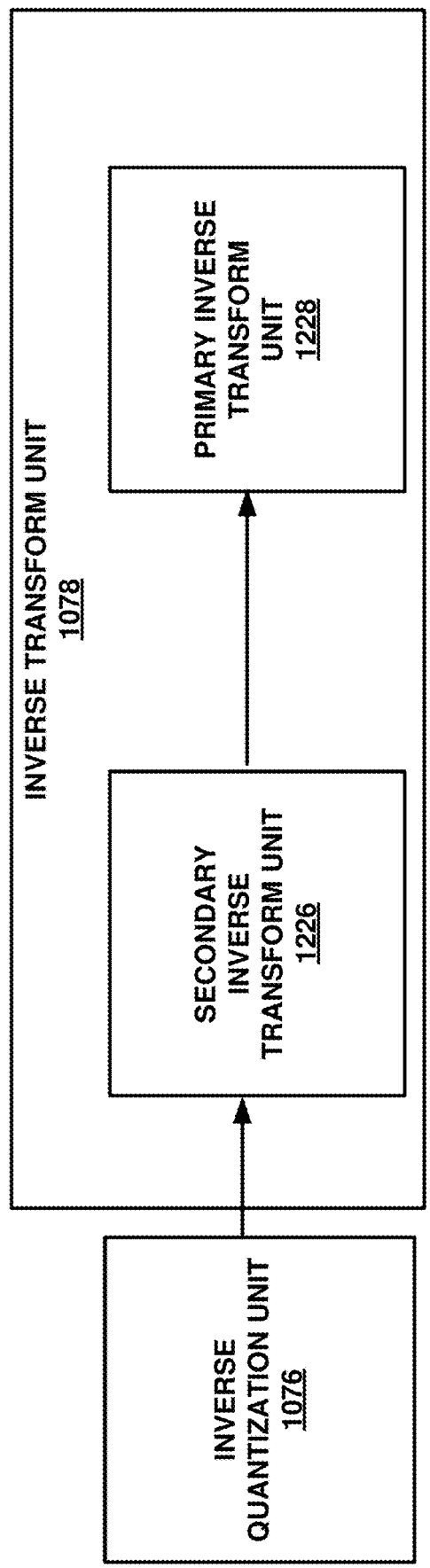
FIG. 12B is an illustration of an example inverse transform processing by a video decoder, in accordance with one or more techniques described in this disclosure.

FIG. 12B is an illustration of an example transform processing by video decoder 170, in accordance with one or more techniques described in this disclosure. In the example of FIG. 12B, inverse transform unit 1078 of video decoder 170 comprises a secondary inverse transform unit 1226 and a primary inverse transform unit 1228. Inverse quantization unit 1076 inverse quantizes the quantized transform coefficients provided in the bitstream and decoded by entropy decoding unit 1070. Secondary inverse transform unit 1226 applies a non-separable inverse transform, which includes assigning a window, assigning a weight for each position inside the window, and determining the non-separable transform output coefficient block based on the assigned weights. Primary inverse transform unit 1228 applies a separable inverse transform on the 2-dimensional coefficient block to generate a residual coefficient block for video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    forming a residual video block, wherein forming the residual video block comprises subtracting at least one predictive block from a video block being coded;
    applying a non-separable transform to at least part of an input data block comprising a number of coefficients to generate a non-separable transform output coefficient block, wherein applying the non-separable transform comprises:
        assigning a window of a predetermined size wherein the size of the window is smaller than the number of coefficients,
        assigning a weight for each position inside the assigned window, and
        determining the non-separable transform output coefficient block based on the assigned weights; and
    generating the encoded video data based on the determined non-separable transform output coefficient block.

2. The method of claim 1, wherein the input data block comprises the residual video block.

3. The method of claim 1, wherein the non-separable transform comprises a first transform or second transform.

4. The method of claim 1, wherein the generating the encoded video data comprises quantizing the non-separable transform output coefficient block.

5. The method of claim 1, wherein determining the non-separable transform output coefficient block based on the assigned weights comprises calculating a weighted sum of samples of the input data block in the assigned limited size window, wherein the samples of the input data block are weighted by the corresponding assigned weights in the same position.

6. The method of claim 1, wherein the assigned window comprises at least one of a square, rectangle, triangle, diamond, or an arbitrary pre-defined shape.

7. The method of claim 1, wherein the assigned window is based on an index of the non-separable transform output coefficient.

8. The method of claim 1, wherein the assigned window is based on decoded information, wherein the decoded information comprises information based on at least one of intra mode, block size, block shape, block height, block width, QP, or a number of nonzero coefficients of a first coefficient block.

9. The method of claim 1, further comprising:
    applying a first transform to the residual video block to generate a first transform output coefficient block; and wherein the input data block comprises the first transform output coefficient block.

10. The method of claim 9, wherein the non-separable transform comprises a second transform.

11. The method of claim 10, further comprising:
determining a number of nonzero coefficients of a first coefficient block within a sub-block of the first coefficient block; and
determining whether the number of nonzero coefficients exceeds a threshold.

12. The method of claim 11, wherein if the threshold is exceeded, determining the non-separable transform output coefficient block.

13. The method of claim 11, wherein if the threshold is not exceeded, not determining the non-separable transform output coefficient block.

14. A method of decoding video data, the method comprising:
receiving an input data block;
applying an inverse non-separable transform to at least part of the input data block comprising a number of coefficients to generate an inverse non-separable transform output coefficient block, wherein applying the inverse non-separable transform comprises:
assigning a window of a predetermined size wherein the size of the window is smaller than the number of coefficients,
assigning a weight for each position inside the assigned window, and
determining the inverse non-separable transform output coefficient block based on the assigned weights; and
forming a decoded video block based on the determined inverse non-separable transform output coefficient block, wherein forming the decoded video block comprises summing a residual video block with one or more predictive blocks.

15. The method of claim 14, wherein the inverse non-separable transform output coefficient block comprises the residual video block.

16. The method of claim 14, wherein the inverse non-separable transform comprises a first inverse transform or second inverse transform.

17. The method of claim 14, wherein the input data block is configured to be generated using inverse quantization.

18. The method of claim 14, wherein determining the inverse non-separable transform output coefficient block based on the assigned weights comprises calculating a weighted sum of the samples of the input data block in the assigned window, wherein the samples of the input data block are weighted by the corresponding assigned weights in the same position.

19. The method of claim 14, wherein the assigned window comprises at least one of a square, rectangle, triangle, diamond, or an arbitrary pre-defined shape.

20. The method of claim 14, wherein the assigned window is based on an index of the inverse non-separable transform output coefficient.

21. The method of claim 14, wherein the assigned window is based on decoded information, wherein the decoded information comprises information based on at least one of intra mode, block size, block shape, block height, block width, or QP.

22. The method of claim 14, further comprising:
applying a first inverse transform to the inverse non-separable transform output coefficient block to generate the residual video block; and wherein the input data block comprises the first transform output coefficient block.

23. An apparatus for encoding video data comprising:
a memory configured to store the video data; and
a video encoder configured to:
form a residual video block, wherein forming the residual video block comprises subtracting at least one predictive block from a video block being coded;
apply a non-separable transform to at least part of an input data block comprising a number of coefficients to generate a non-separable transform output coefficient block, wherein applying the non-separable transform comprises:
assigning a window of a predetermined size wherein the size of the window is smaller than the number of coefficients,
assigning a weight for each position inside the assigned window, and
determining the non-separable transform output coefficient block based on the assigned weights; and
generate the encoded video data based on the determined non-separable transform output coefficient block.

24. The apparatus of claim 23, wherein the input data block comprises the residual video block.

25. The apparatus of claim 23, wherein the non-separable transform comprises a first transform or second transform.

26. The apparatus of claim 23, wherein generating the encoded video data comprises quantizing the non-separable transform output coefficient block.

27. The apparatus of claim 23, wherein determining the non-separable transform output coefficient block based on the assigned weights comprises calculating a weighted sum of samples of the input data block in the assigned window, wherein the samples of the input data block are weighted by the corresponding assigned weights in the same position.

28. The apparatus of claim 23, wherein the assigned window comprises at least one of a square, rectangle, triangle, diamond, or an arbitrary pre-defined shape.

29. The apparatus of claim 23, wherein the assigned window is based on an index of the non-separable transform output coefficient.

30. The apparatus of claim 23, wherein the assigned window is based on decoded information, wherein the decoded information comprises information based on at least one of intra mode, block size, block shape, block height, block width, QP, or a number of nonzero coefficients of a first coefficient block.

31. The apparatus of claim 23, further comprising:
applying a first transform to the residual video block to generate a first transform output coefficient block; and
wherein the input data block comprises the first transform output coefficient block.

32. The apparatus of claim 31, wherein the non-separable transform comprises a second transform.

33. The apparatus of claim 32, further comprising:
determining a number of nonzero coefficients of a first coefficient block within a sub-block of the first coefficient block; and
determining whether the number of nonzero coefficients exceeds a threshold.

34. The apparatus of claim 33, wherein if the threshold is exceeded, determining the non-separable transform output coefficient block.

35. The apparatus of claim 33, wherein if the threshold is not exceeded, not determining the non-separable transform output coefficient block.

36. An apparatus for decoding video data comprising:
a memory configured to store the video data; and
a video decoder configured to:
receive an input data block;
apply an inverse non-separable transform to at least part of the input data block comprising a number of coefficients to generate an inverse non-separable transform output coefficient block, wherein applying the inverse non-separable transform comprises:
assigning a window of a predetermined size wherein the size of the window is smaller than the number of coefficients,
assigning a weight for each position inside the assigned window, and
determining the inverse non-separable transform output coefficient block based on the assigned weights; and
form a decoded video block based on the determined inverse non-separable transform output coefficient block, wherein forming the decoded video block comprises summing a residual video block with one or more predictive blocks.

37. The apparatus of claim 36, wherein the inverse non-separable transform output coefficient block comprises the residual video block.

38. The apparatus of claim 36, wherein the inverse non-separable transform comprises a first inverse transform or second inverse transform.

39. The apparatus of claim 36, wherein the input data block is configured to be generated using inverse quantization.

40. The apparatus of claim 36, wherein determining the inverse non-separable transform output coefficient block based on the assigned weights comprises calculating a weighted sum of the samples of the input data block in the assigned window, wherein the samples of the input data block are weighted by the corresponding assigned weights in the same position.

41. The apparatus of claim 36, wherein the assigned window comprises at least one of a square, rectangle, triangle, diamond, or an arbitrary pre-defined shape.

42. The apparatus of claim 36, wherein the assigned window is based on an index of the inverse non-separable transform output coefficient.

43. The apparatus of claim 36, wherein the assigned window is based on decoded information, wherein the decoded information comprises information based on at least one of intra mode, block size, block shape, block height, block width, or QP.

44. The apparatus of claim 36, further comprising:
applying a first inverse transform to the inverse non-separable transform output coefficient block to generate the residual video block.

45. The method of claim 1, wherein the input data block is 8×8 and the size of the assigned window is 3×3.

* * * * *